United States Patent
Stevens et al.

(10) Patent No.: US 9,810,923 B2
(45) Date of Patent: Nov. 7, 2017

(54) DEFORMABLE MEMBRANE ASSEMBLIES

(71) Applicant: Adlens Ltd., Oxford (GB)

(72) Inventors: Robert Edward Stevens, Oxford (GB); Alex Edginton, Oxford (GB); Benjamin Thomas Tristram Holland, Oxford (GB); Daniel Paul Rhodes, Oxford (GB); Dijon Pietropinto, Oxford (GB); Derek Paul Forbes Bean, Oxford (GB); Roger Brian Minchin Clarke, Melbourn (GB); Peter Lee Crossley, Melbourn (GB); Richard Leefe Douglas Murray, Melbourn (GB); Edwin James Stone, Melbourn (GB)

(73) Assignee: Adlens Ltd., Oxford (GB)

( * ) Notice: Subject to any disclaimer, the term of this patent is extended or adjusted under 35 U.S.C. 154(b) by 0 days.

(21) Appl. No.: 14/388,747

(22) PCT Filed: Dec. 14, 2012

(86) PCT No.: PCT/EP2012/075549
§ 371 (c)(1),
(2) Date: Sep. 26, 2014

(87) PCT Pub. No.: WO2013/143630
PCT Pub. Date: Oct. 3, 2013

(65) Prior Publication Data
US 2015/0055084 A1    Feb. 26, 2015

(30) Foreign Application Priority Data

Mar. 27, 2012 (GB) .................................. 1205394.8
Jun. 20, 2012 (WO) ................. PCT/GB2012/051426
Nov. 23, 2012 (GB) .................................. 1221140.5

(51) Int. Cl.
*G02C 7/08* (2006.01)
*G02B 3/14* (2006.01)

(52) U.S. Cl.
CPC ............... *G02C 7/085* (2013.01); *G02B 3/14* (2013.01)

(58) Field of Classification Search
CPC ... G02C 7/00; G02C 7/02–7/028; G02C 7/81; G02C 7/085
(Continued)

(56) References Cited

U.S. PATENT DOCUMENTS 5,371,629 A * 12/1994 Kurtin .................... G02C 7/085
351/158
2003/0007236 A1  1/2003 Schachar et al.
(Continued)

FOREIGN PATENT DOCUMENTS

JP    H11505335 A    5/1999
JP    2002517013 A    6/2002
(Continued)

*Primary Examiner* — Ricky Mack
*Assistant Examiner* — Robert E Tallman
(74) *Attorney, Agent, or Firm* — Mintz Levin Cohn Ferris Glovsky and Popeo, P.C.

(57) ABSTRACT

The present invention provides a deformable membrane assembly 1 comprising an elastic membrane 8 that is held under tension around its edge by a bendable membrane supporting member 2,10, a body of fluid in contact with one face of the membrane, the pressure of the fluid being controllable for adjusting the shape of the membrane, and one or more bending controllers 24 acting on the supporting member 2, 10 to control the bending of the supporting member in response to loading through tension in the membrane. The bending stiffness of the membrane-supporting member 2, 10 varies round its extent to control the profile of the edge of the membrane 8; etc. upon actuation. A variety of different types of bending controllers are
(Continued)

disclosed which permit out-of-plane bending of the supporting member 2, 10 but prevent or control in-plane bending or deformation of the supporting member. In some embodiments, the bending controllers permit a degree of controlled in-plane bending of the supporting member 2, 10 in order to control the strain in the membrane 8 upon actuation.

25 Claims, 25 Drawing Sheets

(58) Field of Classification Search
USPC ............ 351/159.01, 159.39–159.41, 159.68
See application file for complete search history.

(56) References Cited

U.S. PATENT DOCUMENTS

| | | |
|---|---|---|
| 2003/0095336 A1 | 5/2003 | Floyd |
| 2010/0182703 A1 | 7/2010 | Bolis |
| 2010/0208357 A1* | 8/2010 | Batchko .................. G02B 3/14 359/666 |
| 2011/0085131 A1 | 4/2011 | Gupta et al. |
| 2011/0235186 A1* | 9/2011 | Blum ...................... G02B 3/14 359/665 |

FOREIGN PATENT DOCUMENTS

| | | |
|---|---|---|
| JP | 2010533886 A | 10/2010 |
| JP | 2011516925 A | 5/2011 |
| WO | WO-91/17463 A1 | 11/1991 |
| WO | WO-9811458 A1 | 3/1998 |
| WO | WO-99/61940 A1 | 12/1999 |
| WO | WO-2011/046956 A1 | 4/2011 |
| WO | WO-2013144533 A1 | 10/2013 |

\* cited by examiner

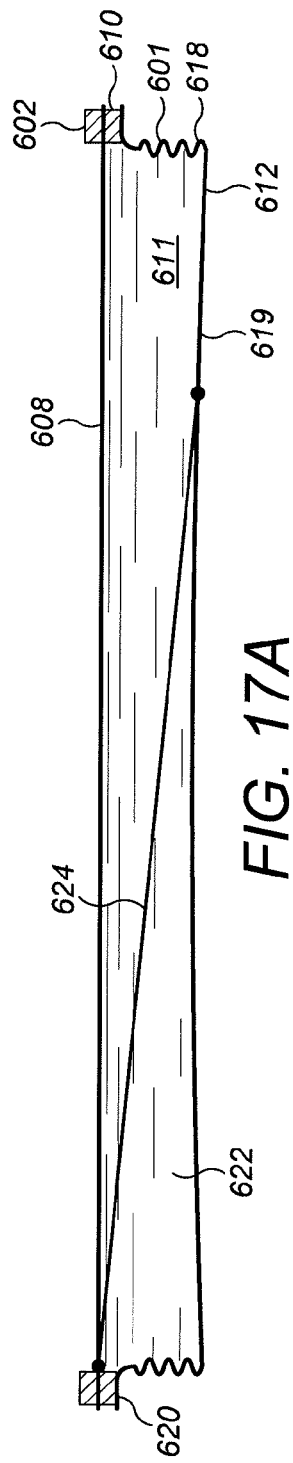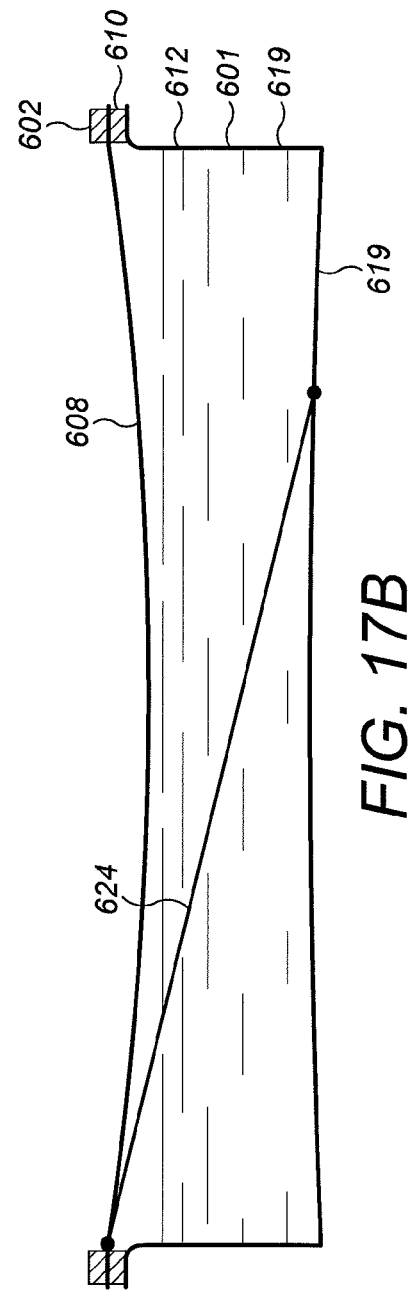

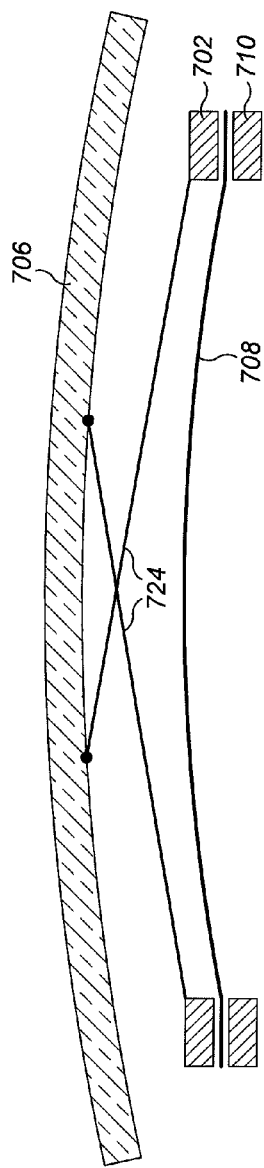
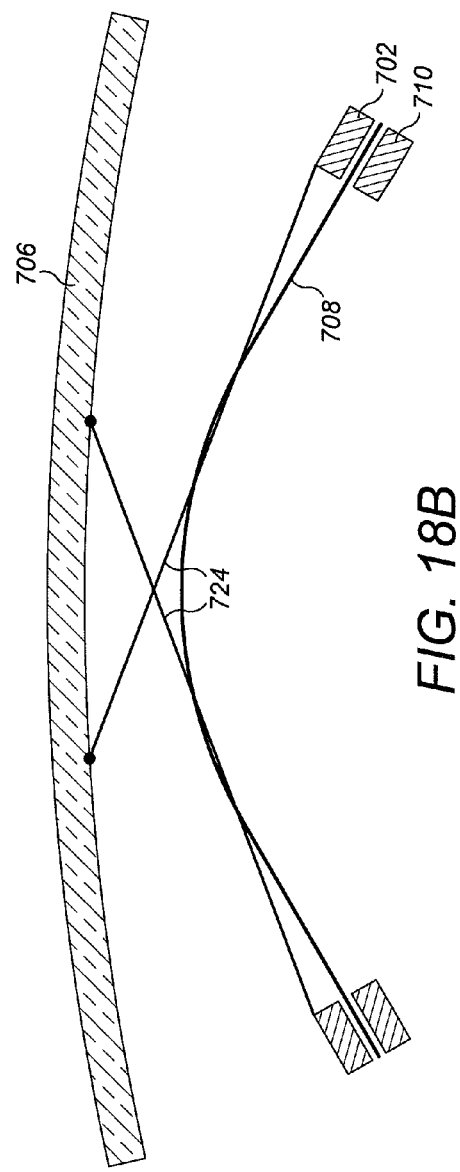

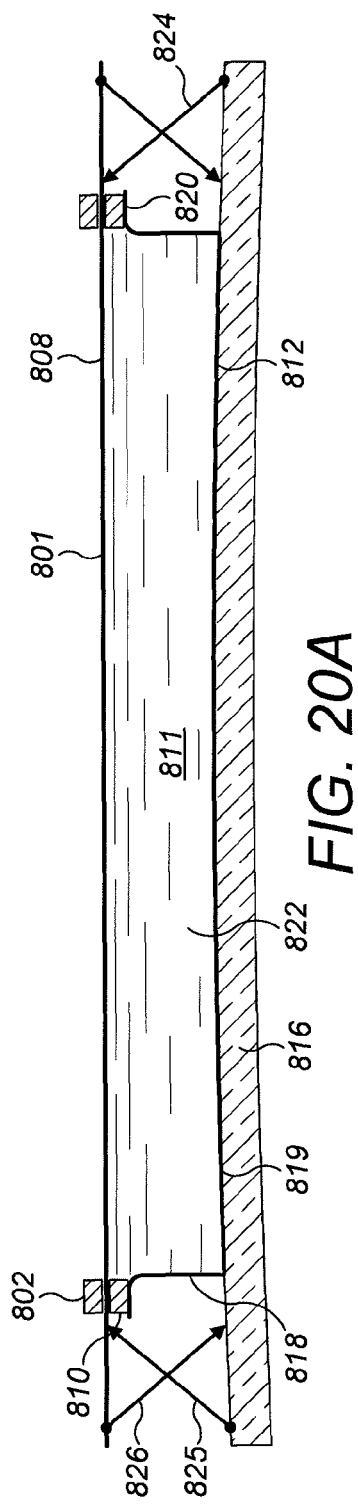
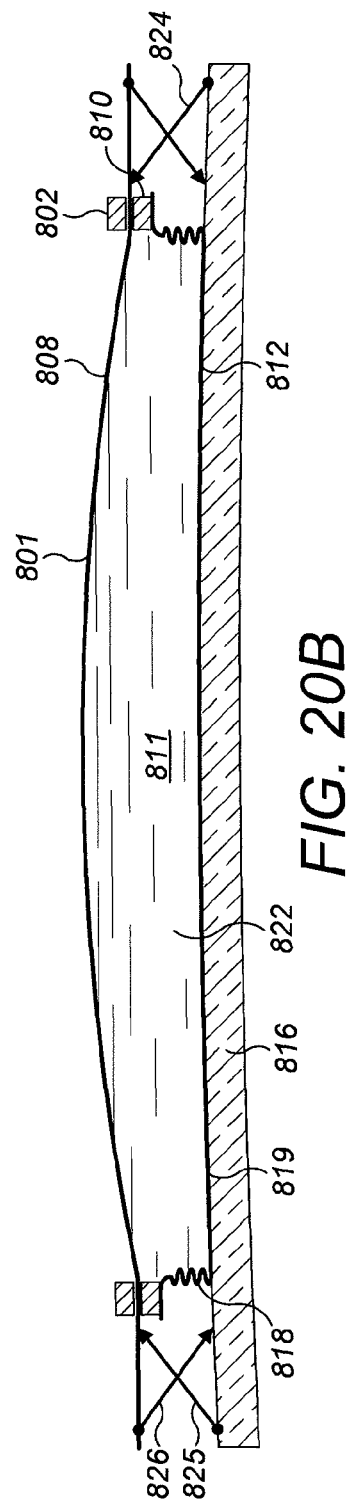
FIG. 20A
FIG. 20B

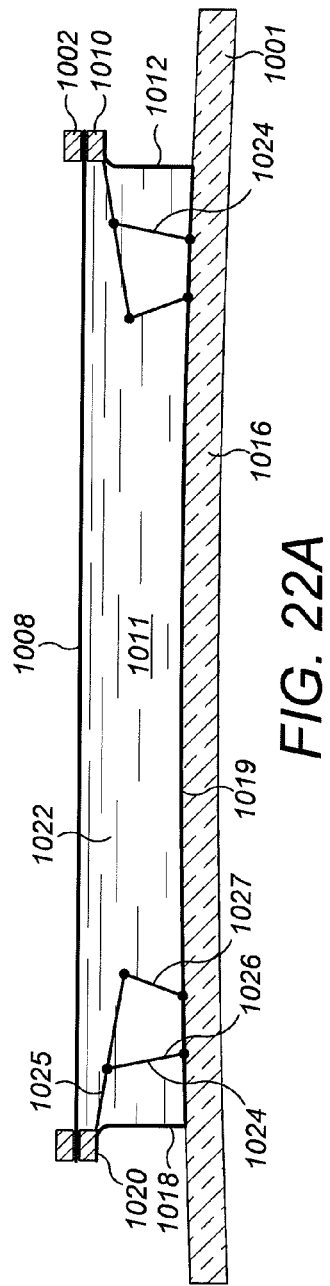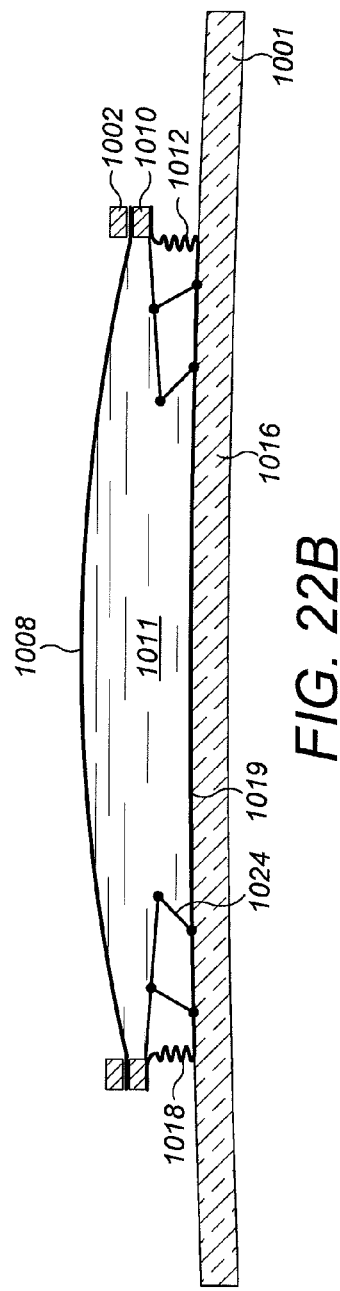

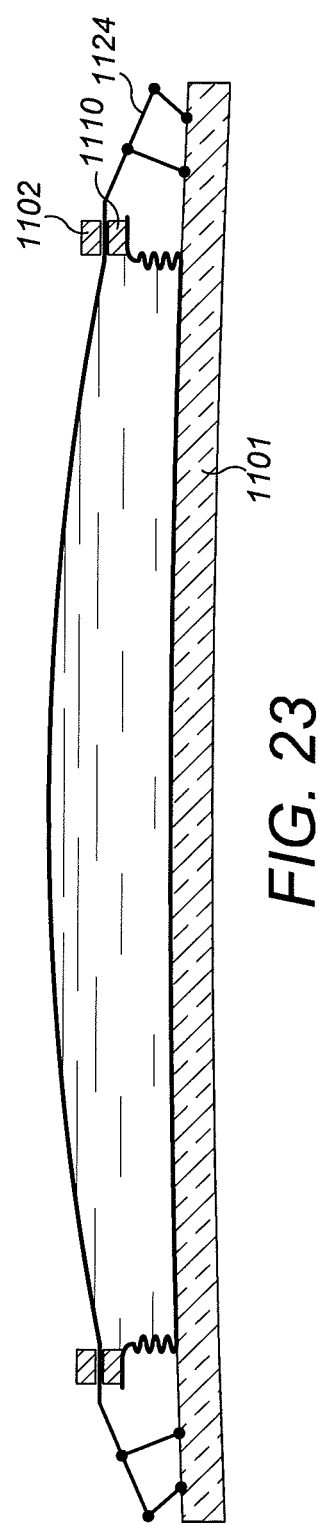

DEFORMABLE MEMBRANE ASSEMBLIES

CROSS-REFERENCE TO RELATED APPLICATIONS

This application is a national stage application, filed under 35 U.S.C. §371, of International Application No. PCT/EP2012/075549, filed on Dec. 14, 2012, which claims priority to, and benefit of Great Britain Application No. 1205394.8, filed on Mar. 27, 2012; International Patent Application No. PCT/GB2012/051426, filed on Jun. 20, 2012; and, Great Britain Application No. 1221140.5, filed on Nov. 23, 2012.

The present invention relates to deformable membrane assemblies in which fluid pressure is used to control the shape of an elastic membrane by applying the fluid directly to one face of the membrane, and has particular reference to fluid-filled lenses and mirrors in which the elastic membrane forms a lens or mirror surface, and the pressure of the fluid is controlled to adjust the degree of curvature of the membrane and thus the power of the lens or mirror, but the invention is equally applicable to other apparatus or equipment in which an elastic surface of statically or dynamically variable shape is required.

Fluid filled lenses of the kind in which the pressure of fluid is used to control the shape of an elastic membrane in contact with the fluid are known in the art. Generally these lenses may be of the "fluid injection" type, in which the amount of fluid is controlled within an envelope having a substantially fixed volume that is bounded on one side by the membrane, or the "fluid compression" type in which the volume of an envelope is adjusted that is bounded on one side by the membrane and contains a fixed amount of fluid. In each case, the pressure of the fluid within the envelope is adjusted, either by adding or removing fluid to or from the envelope, or by changing the volume of the envelope, to control the fluid pressure acting on the membrane, thereby to control the shape of the membrane.

In such a membrane assembly, it is often desired that the elastic membrane should be flat in an un-actuated state. In the case of a fluid-filled lens, for instance, it is desirable that in the un-actuated state the lens surface formed by the elastic membrane should be planar with no focal power. As the fluid pressure within the envelope is selectively increased (or decreased) the membrane distends to increase the focal power of the lens, either negatively or positively. For a lens application, the membrane is normally required to distend spherically or substantially spherically. In the un-actuated state it is desirable that the elastic membrane should be held under tension (pre-tension) to prevent unwanted sagging or wrinkling of the membrane owing to temperature or gravitational effects, or as a result of inertial effects within the fluid when the lens is moved. In some instances, the pre-tension that is required within the membrane to prevent sagging may be of the same order of magnitude as the additional tension that is applied to the membrane upon actuation. However, in other assemblies, depending on the thickness and modulus of the membrane materials it may be several orders of magnitude greater.

WO 98/11458 A1 for instance discloses a selectively variable focus lens having first and second transparent, flexible membranes, each of which is tensioned across and held by a peripheral annular frame formed from first, second and third inter-engaging rings. The lens of WO 98/11458 A1 is circular, and so the peripheral annular frame can be made stiff to support the membranes under tension.

However, in some membrane assemblies of this kind, the membrane is supported by a flexible ring or other membrane-supporting member that is designed to bend round its extent when the lens is actuated and the membrane changes shape in order to allow the membrane to adopt a predefined form. For instance, U.S. Pat. No. 5,371,629 A discloses a variable focal length lens having a non-circular membrane that is mounted on a membrane support having an annular rim that is designed to flex in a controlled manner so that, despite the use of a non-circular membrane, the membrane maintains a substantially spherical shape as it distends, thereby permitting magnification changes without introducing undesirable amounts of distortion.

One of the problems inherent in the design of the lens of U.S. Pat. No. 5,371,629 A is that tension in the membrane acts on the flexible rim of the membrane support. Although the increased load applied to the rim upon actuation of the lens may not be sufficiently great on its own to be a significant problem, any pre-tension applied to the membrane of sufficient magnitude to prevent sagging or wrinkling to an acceptable degree would be; the flexible nature of the rim means that such a level of pre-tension would tend to deform the annular rim in an undesired and uncontrolled manner, which would impair the optical quality of the lens.

Co-pending international patent application no. PCT/GB2012/051426, the contents of which are fully incorporated herein by reference, also discloses a deformable membrane assembly comprising an elastic membrane that is held around its edge by a resiliently bendable supporting ring.

An object of the present invention is to ameliorate the above-mentioned problem by providing a deformable membrane assembly having an elastic membrane that may be mounted on a bendable membrane supporting member under sufficient pre-tension to reduce sagging or wrinkling of the membrane, but with reduced distortion in the shape of the membrane.

In one aspect of the present invention therefore there is provided a deformable membrane assembly comprising an elastic membrane that is held around its edge by a bendable membrane supporting member; a body of fluid in contact with one face of the membrane, the pressure of the fluid being controllable for adjusting the shape of the membrane; and one or more bending control members acting on the supporting member to control the bending of the supporting member in response to loading through tension in the membrane.

The pressure of the fluid may be controllable for selectively adjusting the shape of the membrane between an un-actuated state and a fully actuated state. The fluid may be contained within a fluid-tight envelope, one wall of which is formed by the elastic membrane. The fluid may be any suitable fluid, including gases. For instance, the fluid may be water or air. To an extent, the choice of fluid will be determined by the intended application for the deformable membrane assembly. In some embodiments, a gel may suitably be used. For optical uses, where the membrane assembly may be a variable focus transmitting lens assembly, transparent oil at the wavelength of interest, such as silicone oil for the visible spectrum, which can be index-matched to other components of the assembly, has been found to be particularly advantageous. Suitably said fluid may comprise a silicone oil such, for example, as 1,3,5-trimethyl-1,1,3,5,5-pentaphenyltrisiloxane having a molecular weight of 546.88 (which is commercially available from Dow Corning Corporation of Midland, Mich., USA under the trade name DC-705) or 1,3,3,5-tetramethyl-1,1,5,5-tetraphenyltrisiloxane having a molecular weight of 484.81 (available from Dow Corning under the trade name DC-704).

Suitably the assembly may comprise means for selectively adjusting the pressure of the fluid, e.g., a fluid pressure adjusting mechanism.

In some embodiments, the envelope may have an adjustable volume, and the assembly may comprise means for selectively adjusting the volume of the envelope to control the pressure of the body of fluid in the envelope, e.g. an envelope volume adjusting mechanism. For instance, the envelope may be compressible and mounted to a fixed support forming part of the assembly, and said volume adjusting means may be operable for compressing or expanding the envelope against the fixed support, e.g., in the manner of bellows, thereby to change the volume of the envelope with a fixed amount of fluid ("expansion mode" or "compression mode"). The fixed support may be arranged to hold the envelope at a first position on the envelope, and the volume adjusting means may be arranged to apply a compressive or expansive force to the envelope at a second position on the envelope, the first and second positions being spaced apart in the direction of compression or expansion and the envelope having a flexible side wall between the first and second positions to allow the envelope to be compressed or expanded.

In some embodiments, the envelope may be held around its periphery by the fixed support at the first position, or the fixed support may comprise a rigid body to which the envelope is mounted. For example the envelope may further comprise another wall opposite the membrane, and said other wall may be disposed contiguously against the rigid body. In yet another embodiment, said other opposite wall of the envelope may be rigid and may serve as the fixed support. Suitably, the other wall may be transparent and may provide a lens surface.

The fluid-filled compressible or expandable envelope in accordance with the invention may suitably be resiliently compressible or expandable. When compressed (or expanded) the pressure within the envelope is adjusted as compared with ambient pressure, and upon removing the force that serves to compress (or expand) the envelope upon actuation of the assembly, the envelope returns resiliently to its un-actuated state to balance the pressure across the membrane. In this way, the fluid-filled envelope may behave like a fluid-filled cushion.

Alternatively, the volume of the envelope may remain substantially constant (other than distension of the membrane causing a slight increase or decrease in the actual volume) and the fluid pressure may be controlled by selectively injecting or removing fluid from the envelope, for example by means of a selectively operable pump ("injection mode").

Adjusting the pressure of the fluid causes the membrane to distend and become more curved. Typically, but not necessarily, the membrane may be flat or substantially flat in the un-actuated state, when the pressure difference across the membrane is minimal, i.e. the fluid is at ambient pressure, and becomes progressively more distended as the fluid pressure is increased or decreased upon actuation of the assembly. Upon actuation the membrane changes shape, typically from a planar datum form to a distended convex or concave form. On actuation therefore, regardless of its initial shape, the membrane is stretched and the strain in the membrane increases. In some embodiments, for some applications, the actuation strain may be up to about 57%, which corresponds to a hemisphere, but more typically, the actuation strain may be in the range 0.05% to 10%, 15%, 20% or 25%. In some embodiments, for instance where the assembly comprises a lens, the strain in the membrane may increase upon actuation by up to about 1%. Suitably the actuation strain may be in the range about 0.1-5%, e.g. about 0.25%.

The membrane may be circular or non-circular and may be made from any suitable elastic material known to those skilled in the art. Suitably the membrane should have an elastic modulus of up to about 100 MPa. Membranes with an elastic modulus in the range 1-10 or 20 MPa have been found to be satisfactory. For instance, in one embodiment, a membrane with an elastic modulus of about 5 Pa may be used. Suitable membrane materials include polyethylene terephthalate (e.g. Mylar®), polyesters, silicone elastomers (e.g. poly(dimethylsiloxane), thermoplastic polyurethanes (e.g. Tuftane®), vinylidene chloride polymers (e.g. Saran®) or glass of suitable thickness. In some embodiments, the membrane may comprise a single layer of material, but in other embodiments, the membrane may comprise a plurality of laminated layers.

The membrane supporting member holds the membrane around its edge. Suitably the supporting member may encircle the membrane. In the case of an assembly that operates in compression mode or expansion mode, the supporting member may hold the fluid-filled envelope at the second position on the envelope as mentioned above. The supporting member may comprise a plurality of discrete sections that are spaced circumferentially round the membrane, but preferably the supporting member extends continuously round the membrane in a closed loop. Suitably, the membrane supporting member may comprise a supporting ring that holds the edge of the membrane. The supporting member may be a separate part that is free to move in the manner described below. By "ring" is meant a closed loop having the same shape as the edge of the membrane; the term "ring" as used herein does not necessarily imply that the supporting member is circular. The ring may have an inner side defining an opening across which the membrane is disposed, and an outer side that is unconstrained, except where the ring is acted on for actuating the assembly. The supporting member may be planar in the un-actuated state, especially when the membrane is also flat when un-actuated.

It is generally desired that upon actuation the membrane should adopt a predefined form. The shape of the membrane is affected by the shape and configuration of the edge of the membrane where it is attached to the membrane supporting member. Accordingly, as described in more detail below, the supporting member is bendable round its extent to allow the profile of the edge of the membrane to change as it distends upon actuation. In some embodiments, the configuration of the supporting member may be adjusted actively as the assembly is actuated such that it adopts a predetermined profile that conforms to the desired predefined form of the membrane. Alternatively, the configuration of the supporting member may be adjusted passively, for example in response to the increasing surface tension in the membrane or the native tensile properties of the supporting member. In other embodiments, a mixture of active and passive control may be used, whereby the position of the supporting member at one or more control points round the supporting member is actively controlled, and the supporting member is allowed to bend passively between the control points. Regardless of how the shape of the supporting member is controlled, the shape of the supporting member when actuated should have a predetermined profile that matches the predefined actuated form of the membrane.

In order to achieve the predetermined profile, the supporting member should bend (deflect) on a primary bending axis that is generally parallel to the direction of distension of the membrane. By 'bending axis' herein is meant the direction in which the supporting member deflects when it bends. Where the membrane is planar in the un-actuated state or any actuated state the primary bending axis may be substantially normal to the plane of the membrane. The plane of the membrane in such a planar state, e.g. when un-actuated, may serve as a planar datum, and the primary bending axis may be normal or substantially normal to this datum. In some embodiments, the assembly may be configured such that the membrane is never allowed to become planar. However in such embodiments, the membrane may still have a theoretical planar state if its movement were to be permitted to continue beyond its un-actuated or fully actuated states, and in such embodiments, the theoretical planar state may likewise serve as a datum plane for the purposes of measuring the degree of deflection of the supporting member.

For optical applications, the predefined form of the membrane will usually define an optical axis, and in such cases, the primary bending axis will generally be substantially parallel to the optical axis. The supporting member may suitably be bendable on the primary bending axis round the entire extent of the supporting member, and may be unrestrained, except at selected control points as described below. The supporting member may float freely in open space around the supporting member, except where its movement may be controlled at the control points.

Advantageously, the membrane may be pre-tensioned on the membrane supporting member. In the case of laminated membrane comprising a plurality of layers, it is desirable that at least one of the layers should be held under pre-tension in the un-actuated state. The membrane may be held by the supporting member under tension in the un-actuated state, whereby the pre-tension serves to reduce or minimise sagging of the membrane when the pressure difference across the membrane is minimal. In some embodiments the membrane may be pre-tensioned to a strain of up to about 20% in the un-actuated state; pre-strains of between 0.5-10% or 1-5%, e.g. 2 or 3%, may be appropriate in some embodiments.

In some embodiments the supporting member may be resiliently bendable. The membrane supporting member may have a constant or substantially constant stiffness round its extent. Alternatively the flexible membrane supporting member may have a bending stiffness that varies round its extent, such that it bends in response to the increased loading on it that results from the increased surface tension in the membrane as the membrane distends upon actuation to adopt the predetermined profile that conforms to the predefined form of the membrane. This may be especially useful when the membrane has a non-circular shape and is required to deform spherically when actuated, but it may also be useful when the membrane is circular and non-spherical deformation of the membrane is desired, for example according to one or more Zernike polynomials as described below.

The distended shape of the membrane is a function of the dimensions and material properties of the membrane and of the membrane supporting member, the pressure across the membrane and the profile of the edge of the membrane. By using a supporting member that bends variably round its extent in response to active displacement at selected control points or increasing surface tensions in the membrane as taught in PCT/GB2012/051426, the profile of the edge of the membrane can be controlled, thereby allowing the membrane to adopt the predefined form when distended.

The bending stiffness and the variation in the bending stiffness of the supporting member round its extent may be selected to control the shape of the edge of the membrane as desired as the membrane is deformed to allow the membrane to adopt the predefined form. The membrane supporting member may exhibit a variation in bending stiffness round its extent such that the membrane distends substantially spherically when actuated, or in accordance with another predefined form defined by one or more Zernike polynomials of the general formula $Z_n^{\pm m}$, which is useful where the membrane assembly of the invention comprises a lens assembly. Generally the predefined form may have a centre, which may be at the vertex of the form. For instance a lens or mirror surface may have an optical centre on an optical axis, and the optical centre will usually correspond to the vertex. A priority for ophthalmic applications is to be able to achieve vision correction with a linear superposition of $Z_2^{\pm 2}$ (astigmatism) and $Z_2^0$ (sphere for distance correction). Opticians typically prescribe lenses based on these formulae. An explanation of the various Zernike polynomials can be found in Principles of Optics[1].

[1] "Principles of Optics" M. Born and E. Wolf, 7th Ed, C.U.P., (1999). ISBN 0-521-64222-1

Various predefined forms described by Zernike functions, or combinations of more than one such function, are possible using the membrane assembly of the present invention, including for example linear superpositions of scaled Zernike polynomials of the form $Z_n^{\pm m}$:

$Z_2^{\pm 2}$, $Z_2^0$, $Z_j^{\pm j}$, $Z_j^{\pm k}$ (k≤j)

Higher order surfaces with components $Z_j^{\pm k}$(k≤j) may be possible where the shape of the membrane edge permits. In general, except at its periphery, a surface achievable by deforming a membrane with pressure may have one or more local maxima or one or more local minima, but not both, in addition to saddle points. The predefined forms that are achievable are necessarily limited by the shape of the periphery, which is stable in use.

In some embodiments, the supporting member may comprise a resiliently bendable supporting ring Said supporting ring may be made from any material that has a sufficiently high modulus to be made thin relative to the overall dimensions of the membrane assembly (e.g. about 0.05 to about 0.5 mm thickness), is joinable to the adjacent components, exhibits or is so conditioned as to exhibit low creep (to continue to perform over multiple uses) and is elastically deformable. Thus the supporting ring may be made from metal, e.g. stainless steel or titanium; other possibilities are glass and sapphire. By "joinable" is meant joinable by adhesive, crimping, laser welding or ultrasonic welding, or any other means that would be apparent and available to those skilled in the art.

In some embodiments, in order to achieve the desired variation in bending stiffness round the supporting ring, the dimensions of the ring may vary round its extent. The supporting ring may have a substantially uniform depth and a variable width to control the second moment of area round the ring and thus the bending stiffness of the ring. The supporting ring may be narrowest where it is required to bend the most to achieve the predefined form when the membrane is distended. Thus, in some embodiments, the supporting ring may suitably be cut or stamped from a sheet of metal, e.g., stainless steel, of substantially uniform thickness to obtain a circular or non-circular ring of variable width in the plane of the sheet. The supporting ring may be substantially planar when the assembly is un-actuated to impart a planar edge to the membrane.

The required bending stiffness round the supporting ring may conveniently be determined by finite element analysis (FEA), for instance as disclosed in PCT/GB2012/051426. In particular, FEA may be used to calculate the required variation in bending stiffness round the supporting ring that is required to control the bending of the supporting ring, when subjected to an increasing load as the membrane that is connected to the supporting member is strained owing to the increased (or decreased) fluid pressure, to allow the membrane to achieve the predefined form when the assembly is actuated. It will be understood that in some embodiments, such for example as when the membrane assembly comprises a lens or mirror assembly, the membrane may be intended to deform statically, but for other applications such, for example, as acoustics, the membrane may be required to adjust its shape dynamically.

In some embodiments, the supporting ring may comprise one or more ring elements. In some embodiments the ring may comprise a stack of flexible ring elements. The elements may be similar or substantially the same as one another or they may be different. The membrane may be sandwiched between two adjacent ring elements within the stack. By sandwiching the membrane between adjacent ring elements, the torsional forces applied by the membrane to the ring elements may be balanced, resulting in no or substantially no net torsional force on the supporting ring as a whole. It is desirable to avoid torsional forces on the ring that might lead to unwanted distortion in the shape of the ring and thus in the shape of the membrane. In some embodiments, the membrane supporting member may suitably consist of two ring elements. In other embodiments, more than two ring elements may be provided. However, the arrangement should be such that when the membrane is tensioned between the two adjacent ring elements, the torsional forces acting on the ring elements to each side of the membrane should act in opposite directions and thus cancel or substantially cancel each other out.

In embodiments where the assembly operates in compression mode, the force required for compressing or expanding the fluid-filled envelope may be applied directly to the membrane supporting ring at one or more selected control points, so as to deflect the ring relative to the fixed support. As disclosed in detail in co-pending PCT/GB2012/051426, the control points where force is applied to the ring should be selected according to the desired predefined form of the membrane when actuated. As described above, this is because in order to achieve the desired predefined membrane form, the profile of the ring must adopt a matching predetermined profile, and active displacement of the ring at one or more locations round its extent relative to the fixed support to actuate the assembly should comply with that predetermined profile. In other words, when applying a force to the ring to compress or expand the fluid-filled envelope relative to the fixed support, the ring should not be displaced at any point round its extent to a position that does not coincide (within an acceptable tolerance) with the predetermined ring profile that is needed to achieve the predefined membrane form.

The activating force applied to the ring should be applied at least at spaced control points that are located at or proximate each point on the ring where the profile of the ring that is needed to produce the predefined form of the membrane upon deformation exhibits a turning point in the direction of the force applied at the control point between two adjacent points where the profile of the ring exhibits an inflection point or a turning point in the opposite direction.

The force applied to the supporting ring at each control point may be applied by means of one or more ring-engaging members. One or more of the control points may be an actuation point where the or one of the ring-engaging members is configured actively to displace the supporting ring relative to the fixed support. Suitably the supporting ring may be deflected by the ring-engaging member at the or each actuation point in a direction substantially parallel to the primary bending axis.

In some embodiments, one or more of the control points may be passive control points, where the ring-engaging members are connected by a linkage, guide or other mechanism relative to the stationary support, such that the movement of the ring-engaging members is constrained to a particular range or a specific trajectory.

One or more of the control points may be hinge points, where the or one of the ring-engaging members is configured to hold the ring stationary relative to the support—again with an acceptable degree of tolerance. It will be appreciated that where one or more hinge points are provided, the ring is required to remain stationary at the or each hinge point in order to achieve the predefined form of the membrane when actuated; in other words the position of the ring at the or each hinge point when actuated and when un-actuated is the same or substantially the same. When the membrane is planar in the un-actuated state, it will be appreciated that any hinge points will all be situated on the same contour of zero deflection of the supporting member.

Subject to the requirement that there should be a control point at each point on the ring where the profile of the ring that is needed to produce the predefined form of the membrane upon deformation exhibits a turning point in the direction of the force applied at the control point between two adjacent points where the profile of the ring exhibits an inflection point or a turning point in the opposite direction, there may be as many additional control points at other locations round the ring as desired, except that in order to define the plane of the membrane there should always be at least three control points, regardless of the number of inflection points or turning points.

In some embodiments, the control points may comprise at least two adjacent hinge points and at least one actuation point where the ring-engaging member is configured to displace actively the ring relative to the fixed support for adjusting the volume of the fluid-filled envelope.

Between adjacent control points, at least where the profile of the edge of the membrane does not follow a surface contour of the form of the membrane at all selected degrees of actuation of the assembly, the supporting ring should be free to deflect passively on the primary bending axis relative to the fixed support.

In accordance with the invention, the one or more bending control members control the bending or other deformation of the bendable membrane supporting member in response to the surface tension in the membrane. In particular, the one or more bending control members may serve to stabilise the supporting member against unwanted bending or deformation in the un-actuated and actuated states, whilst allowing the supporting member to bend as required when actuated so that the membrane may adopt the predefined form. In principle the one or more bending control members should act only to reinforce the supporting member against unwanted or uncontrolled bending. In practice the one or more bending control members in some embodiments may add slightly to the overall bending stiffness of the supporting member in a predetermined manner, which can be taken into account when calculating the required bending stiffness of the supporting member, but the one or more control members should not impair the desired bending of supporting member.

As described above, the flexible membrane supporting member is subjected to an increasing load as the surface tension in the membrane increases upon actuation of the assembly, and may be subject to a significantly greater load if the membrane is pre-tensioned on the supporting member. The one or more bending control members serve to stabilise the membrane supporting member when subjected to such loads.

The one or more bending control members may modify the bending stiffness of the supporting member in an anisotropic manner. Suitably the one or more bending control members may act to stiffen the supporting member to a greater extent within a plane than on an axis that is transverse to the plane. The one or more bending control members may serve to reduce or prevent deflection of the membrane supporting member in a plane normal to the primary bending axis ("in-plane" stiffness) without significantly affecting deflection of the supporting member on the primary bending axis ("out-of-plane" stiffness). Where the membrane is planar, the bending control member(s) serve to control bending of the supporting member within the plane. Generally the one or more bending control members may serve to restrain the supporting member from collapsing inwardly or in general to preserve the membrane shape in response to lateral forces within, or external to, the membrane assembly.

In some embodiments, the one or more bending control members may also act to control the strain applied to the membrane when the assembly is actuated. That is to say, in some embodiments, the one or more bending control members may allow the supporting member to bend in a direction normal to the primary bending axis in a controlled way upon actuation of the assembly. This may be useful for maintaining substantially isotropic surface tension within the membrane, or for allowing the supporting member to contract inwardly in a controlled way, to change in the area enclosed by the membrane supporting member.

Even in embodiments where the membrane is required to deform spherically when actuated, it may be desirable to allow some controlled in-plane deformation of the membrane supporting member. For instance, the one or more bending control members may adjust the in-plane bending stiffness of the supporting member to allow a degree of inwards compression of the supporting member as the membrane is deformed in order to increase the curvature of the membrane for a given strain. This may be particularly advantageous in situations where it is desired to avoid placing unduly high loads across the interface between the membrane supporting member and the membrane.

The one or more bending control members may be used with a membrane supporting ring of the kind described above, but may also be used with other forms of membrane supporting member in accordance with the present invention.

In some embodiments, said one or more bending control members may comprise a reinforcing diaphragm. Said reinforcing diaphragm may comprise a plate of substantially the same shape as the edge of the membrane and may be fixedly secured to the membrane supporting member so as to allow the transmission of forces therebetween. The plate may be fastened to the supporting member uniformly round the supporting member, for example by adhesive bonding, so that the surface tension in the membrane is transmitted substantially uniformly to the diaphragm. Suitably the plate may be attached to the supporting member continuously round the supporting member. Alternatively the plate may be attached to the supporting member at spaced locations, provided distortion of the supporting member in the region of the points of attachment is avoided. The plate should be attached to the supporting member on an opposite side to the direction of distension of the membrane on actuation.

The plate may suitably have a greater in-plane stiffness orthogonal to the primary bending axis than out-of-plane on the bending axis. The plate may thus serve to stiffen the supporting member in a plane normal to the primary bending axis against the surface tension applied to the supporting member by the membrane, while allowing the supporting member to bend in a predetermined manner on the primary bending axis in response to the surface tension to control the profile of the supporting member.

In some embodiments, the membrane-supporting member may comprise one or more first ring elements, and the membrane may be sandwiched between the first ring element(s) and the reinforcing plate. One or more optional second ring elements may be interposed between the membrane and the plate to space the membrane from the plate. Suitably the membrane supporting member may comprise a single first ring element and a single second ring element. The bending stiffness of the plate and second ring element(s) on the primary bending axis may serve in combination to balance the torsional forces applied to the first ring element by the membrane.

The first ring element may have a thickness in the range 0.2-0.75 mm, suitably 0.3 or 0.4 mm to 0.5 mm. The second ring element may have a thickness in the range 0.01-0.25 mm, suitable 0.025-0.1 mm, e.g. about 0.05 mm.

The plate may have a thickness on the primary bending axis of about 0.1-1.0 mm, preferably 0.3-0.7 mm, e.g. about 0.5 mm, and may be made of polycarbonate, nylon or glass in the case of a lens assembly, or a variety of plastic, metallic or ceramic components or composites in the case of an acoustic or non-transmitting membrane assembly.

In some embodiments the plate may be spaced from the membrane, for example, by the second ring element(s) of the supporting member. Alternatively, the supporting member may comprise only one or more first ring elements disposed to one side of the membrane as described above, and the plate may be attached directly to the other side of the membrane. In such embodiments, the one surface of the plate facing the membrane may be stepped to provide a circumferential mesa that is substantially coterminous in-plane with the first ring element(s) to space the rest of the plate from the membrane. In this way the mesa effectively constitutes an integral second ring element.

The plate may be disposed within the body of fluid, and may therefore be suitably formed with one or more apertures extending therethrough to allow the fluid to move freely to the one face of the membrane. The precise number, size and arrangement of such apertures may be determined by the person skilled in the art to allow the fluid to move freely, within the desired response time or longitudinal frequency response, from one side of the plate to the other, without impairing the ability of the plate to control the in-plane deformation of the membrane supporting member. In some embodiments, such apertures may have substantially no effect on the bending properties of the plate. However, in other embodiments, one or more apertures may be formed in the plate with a size, shape, number and arrangement to control the bending properties of the plate, thereby to afford greater control over the bending of the membrane supporting member in response to surface tension within the membrane.

The membrane may have a generally polygonal shape—for example rectangular, as per the shape of a lens for eyeglasses—and an aperture may be formed in the plate in the vicinity of each corner of the plate. Suitably, each aperture may have the shape of a modified arbelos ("shoemaker's knife") with an elongated stem that is oriented generally on an axis that bisects the corresponding corner of the plate. For instance, in a lens assembly, the stem of each aperture may be angled generally towards the optical centre of the lens surface that is formed by the membrane. In the case of a generally rectangular plate, the apertures may be shaped and arranged such that the plate defines an approximate "cloverleaf" pattern around the apertures. This arrangement is particularly advantageous, because it permits the plate to bend biaxially on the primary bending axis—that is to say, it permits the plate to bend on the primary bending axis along two mutually transverse axes that are normal to the bending axis—, whereas in the absence of such apertures, bending of the plate on the primary bending axis along one axis in the plane of the plate tends to stiffen the plate against bending on the primary bending axis along an axis transverse the one axis in the plane of the plate, which may be undesirable if the supporting member is required to bend along the transverse axis upon actuation to achieve the predetermined profile. Generally it is desired to allow bending of the plate on the primary bending axis along mutually orthogonal axes within the plane of the plate.

In other embodiments, the plate may be formed with a single large, central aperture, such that the plate is, in effect, generally annular. As used herein the term "annular" is not meant to imply that the plate is circular, but simply that it has the shape of a closed loop that generally follows the outline of the membrane supporting member and the periphery of the membrane. The provision of a central aperture in the plate also has the effect of advantageously permitting the plate to bend on the primary bending axis along mutually orthogonal axes within the plane of the plate. Where the membrane supporting member comprises a ring as described above, the in-plane width of the annular plate may suitably be in the range 2-15 times the average width of the supporting ring.

In some embodiments, the reinforcing plate may comprise one or more depending ribs that serve to reinforce the plate against unwanted deformation when it is in a planar state, or to increase the energy required to achieve modes of deformation that are undesired. When the supporting member is planar in the un-actuated or any actuated state and is subject to loading from pre-tension in the membrane, it may be in an unstable state, in which any deviation from flatness releases some of the energy stored in surface tension in the membrane and is therefore favoured. The supporting member may therefore be liable to buckle, causing it, and the membrane mounted on it, to adopt an undesired, energetically more stable, saddle shape. To an extent, this tendency to buckle may persist even once the membrane becomes inflated upon actuation, although the tendency is attenuated as the membrane becomes progressively more distended.

Said one or more ribs may be carried by a face of the plate that faces away from the membrane. The rib or ribs may be joined to the plate at or in the vicinity of points where the supporting member is not displaced upon actuation of the assembly. Suitably, the ribs may follow contours where the membrane is not displaced on the bending axis upon actuation. Alternatively one or more linear ribs may be provided that extend across the plate. In some embodiments, the one or more ribs may engage with one or more fixed parts of the assembly to reinforce the plate against buckling. For instance, the one or more ribs may engage with the fixed support that serves to facilitate compression or expansion of the fluid-filled envelope. In some embodiments, said one or more ribs may be dimensioned and positioned to engage with said other wall of the envelope. Suitably the one or more ribs may be bonded or otherwise joined to said fixed part or parts.

In some embodiments, said one or more bending control members may comprise a plurality of struts that extend between opposite sections or regions of the membrane supporting member and serve to resist in-plane deformation of the supporting member, without hindering out-of-plane deflection on the primary bending axis. Suitably, said struts may be made of polycarbonate or any other suitable material known to those skilled in the art. Said struts may be fixedly secured at each end to the membrane supporting member, for example by adhesive bonding, and a sufficient number of struts may be provided to avoid distortion of the membrane supporting member between the struts. The struts may be attached directly to the membrane supporting member. Alternatively, the ends of the struts may be carried by a closed peripheral web portion that may be joined continuously to the supporting member. Suitably, two or more sets of struts may be provided, with the struts in each set being oriented generally across one another. Preferably the struts in the two or more sets are not joined to one another where they cross. This is particularly advantageous in the case of non-round membrane assemblies, where the surface tension in the membrane may change anisotropically upon actuation. In such cases, the stiffness of the reinforcing member may be tuned independently across each set of struts to achieve a desired anisotropic response to actuation of the membrane, in concert with the anisotropy in the membrane, or to correct for it.

Alternatively, the one or more bending control members may comprise a plurality of levers, wherein each lever is attached at one end to the membrane or membrane supporting member and, at the other end, to one or more fixed parts of the assembly, each lever being arranged to allow free bending of the supporting member on the primary bending axis while preventing, resisting or controlling in-plane deformation of the supporting member. The levers may be attached to the membrane/membrane supporting member and to the fixed part or parts of the assembly by means of a suitable adhesive.

In some embodiments, each lever may be attached at its other end to the fixed support that serves to facilitate compression or expansion of the fluid-filled envelope. Where the other wall of the envelope is rigid or is mounted contiguously to a rigid plate, each lever may be connected at its other end to said other wall. Alternatively the levers may be attached at their other ends to a rigid cover plate that may overlay the membrane in some embodiments. Said front cover plate may be transparent for optical applications and may comprise a fixed lens. An advantage of attaching the levers to such a cover plate is it may obviate the need for a bulky plate or lens part behind the other wall of the envelope. In yet another alternative, each lever may be connected at its other end to a rigid or substantially rigid housing that accommodates the assembly of the invention.

The levers may extend obliquely relative to the supporting member, so that each lever constrains the supporting member to move along an arc defined by the lever when the assembly is actuated. Suitably each lever may subtend a minimum angle of more than 45° with the primary bending axis. In some embodiments, the angle subtended by the primary bending axis and each lever may increase when the assembly is actuated; in other embodiments, the angle may decrease. Depending on the configuration of the assembly and the position of the levers, it is possible that in some embodiments, the angle subtended by some levers will increase upon actuation, whilst the angle subtended by other levers will decrease upon actuation.

In this way, when the assembly is distended away from planar the in-plane displacement of the membrane supporting member is controlled by the levers. Specifically, when the assembly is actuated such that regions of the membrane supporting member are displaced on the bending axis, the movement of those regions normal to the bending axis is controlled by the levers in order to control the line surface tension in the membrane.

Typically, the levers may be disposed inside the closed loop of the membrane supporting member, within the area covered by the membrane ("inboard"), but in some embodiments the ends of some or all of the levers may be connected to the membrane outside of the membrane supporting member instead of to the supporting member. The levers may extend in the same direction or in a plurality of different directions. Suitably, two sets of levers may be provided, with the levers in one set being oriented in a first direction and the levers in the other set being oriented in a second direction. Said first and second directions may be transverse to one another, so that the levers within the first and second sets crossover each other.

In another embodiment, the one or more bending control members may comprise a plurality of linkages circumferentially spaced round the periphery of the membrane, wherein each linkage is connected between the membrane or the membrane supporting member and one or more other fixed parts of the assembly. For instance, each linkage may be connected at one end to the membrane supporting member and at the other end to the fixed support that serves to facilitate compression or expansion of the fluid-filled envelope. In embodiments where said other wall of the envelope is rigid or is mounted contiguously to a rigid plate, each linkage may be connected at the other end to said other wall. Alternatively, the linkages may be connected to the underside of a front cover plate of the kind described above. In yet another alternative the linkages may be connected at the other end to a rigid or substantially rigid housing that accommodates the assembly of the invention.

Said linkages may be disposed outside the periphery of the membrane ("outboard"). Alternatively, they may be disposed in line with the membrane supporting member. In a further embodiment, the linkages may be disposed inboard, inside the closed loop of the membrane supporting member. The former arrangement has the advantage of minimising the restriction to the fluid flow to the membrane. The latter arrangement has the advantage that it requires less space.

Each linkage may be configured to permit bending of the membrane supporting member on the primary bending axis, but to resist movement of the membrane supporting member in-plane normal to the primary bending axis. For instance, in some embodiments, each linkage may comprise two levers, wherein one of the levers is connected slidingly at one end to the membrane supporting member (or via a suitable interface to the membrane) and is pivoted at its other end to the immovable part of the assembly, such as the other wall of the envelope, while the other lever is connected slidingly at one end to the immovable part of the assembly and is pivoted at its other end to the membrane or membrane supporting member. The two levers may be pin-jointed together intermediate their one and other ends.

Alternatively, the one or more bending control members may comprise a plurality of circumferentially spaced linkages that are configured to allow controlled in-plane displacement of the membrane supporting member in addition to permitting bending of the membrane supporting member on the primary bending axis. Thus, in this embodiment, the linkages may each comprise a 4-bar linkage having one lever that is hinged at one end to the membrane or membrane supporting member and two further levers that are each pivoted at one end to the fixed part(s) of the assembly such, for example, as the other opposite wall of the envelope when it is rigid or mounted to a rigid plate. The other ends of the two further levers are pivoted at spaced locations to the one lever to complete the 4-bar linkage, which thus permits bending of the membrane support member on the primary bending axis and controls movement of the membrane support member such that displacement on the primary bending axis causes simultaneous movement of the membrane support member in-plane. As mentioned above, by allowing a small amount of in-plane displacement of the membrane support member, the strain in the membrane can be controlled as it is distended.

Suitably, the levers or linkages may be configured to allow differing amounts of in-plane displacement round the extent of the membrane support member. As the membrane is distended upon actuation, its cross-section changes from being, in effect, a chord of a circle to an arc, with a greater length between the opposite sides of the supporting member. For a membrane which is longer in one in-plane dimension than the other, or for a membrane that is required to deform non-spherically, the strain in the membrane increases non-isotropically as it is distended, with the strain being greater in the one dimension than in the other. The bending control members may be configured to allow greater in-plane displacement of the supporting member on a longer axis of the membrane than on a shorter transverse axis, so as to compensate for the non-isotropic change in strain and to preserve isotropic surface tension within the membrane, or at least to reduce the difference in the in surface tension on the two different dimensions.

In yet another alternative, the one or more bending control members may comprise a plurality of spring members, each of which is connected at one end to the membrane supporting member and at the other end to a suitable constraint boundary such, for example, as the one or more rigid or substantially rigid, non-moving parts of the assembly. In some embodiments, the constraint boundary may comprise a rigid or substantially rigid ring that is disposed around the membrane supporting member. The rigid ring may have substantially the same shape as the membrane supporting member (but larger) or it may have a different shape. Alternatively, the constraint boundary may comprise a housing or the like that accommodates the assembly.

Said spring members may comprise any suitable springs known to those skilled in the art. In some embodiments, each bring member may comprise a coil helical spring. The spring members should be connected to the membrane supporting member in such a manner as to apply a restoring force primarily in a direction substantially normal to the primary bending axis, so that the membrane supporting member is free to bend on the primary bending axis, while the spring members control the deformation of the membrane supporting member normal to the primary bending axis in-plane. The modulus of each spring may be the same or different round the periphery of the membrane supporting member, so as to control the surface tension within the membrane as desired.

In yet another alternative, the one or more bending control members may comprise a plurality of slideways that are engaged with the membrane supporting member to constrain movement of the supporting member upon actuation of the assembly to a predefined locus along the slideways. Thus, in some embodiments, the slideways may comprise a plurality of pins that are disposed around the periphery of the membrane and are disposed through respective apertures formed in the membrane supporting member to allow sliding of the supporting member along the pins. Alternatively, the slideways may comprise tracks, and the membrane supporting member may be equipped with suitable sliders that engage with and slide in the tracks. The pins or tracks may extend primarily along the primary bending axis. In some embodiments, the pins or tracks may be oriented substantially parallel to the primary bending axis, so that the membrane supporting member can only move in the direction of the primary bending axis. However, in some embodiments the pins or tracks may be oriented obliquely to the primary bending axis to allow a degree of in-plane movement of the membrane supporting member upon actuation of the assembly, in order to control the strain within the membrane as described above. Typically, the pins or tracks may be oriented such that upon actuation the ring supporting member, where it is connected to the pin or track, moves inwardly, so as to reduce the strain in the membrane.

In a variant, the one or more bending control members may comprise a plurality of bendable connecting rods that are attached at one end to the membrane supporting member round its extent and oriented substantially in the direction of the primary bending axis. Each connecting rod may be engaged slidably with a mounting member that is fixedly secured to a fixed part of the assembly. The inter-engagement of each connecting rod with its respective mounting member permits sliding of the connecting rod on the primary bending axis, and each mounting member includes a flange portion that is arranged to prevent the connecting rod bending when the assembly is un-actuated. Upon actuation of the assembly, the connecting rod slides relative to its respective mounting member, such that the one end of the connecting rod protrudes progressively beyond the flange portion, the portion of the connecting rod that is thus disclosed being permitted to bend in-plane, transverse to the primary bending axis. The inter-engagement of the connecting rod and mounting member thus permits free movement of the membrane supporting member on the primary bending axis, as required, and allows controlled displacement of the membrane supporting member in-plane as the assembly is progressively actuated.

The membrane assembly of the present invention may be used for a variety of different applications in which it is desired to deform progressively and controllably a membrane to provide a surface having a predefined form. The membrane assembly may be used for both static and dynamic applications. For instance, the assembly may be used to provide an acoustic surface, e.g., a diaphragm for a loudspeaker or other acoustic transducer. A particular application of the membrane assembly lies in the field of optics, where the membrane may be used to provide a lens or mirror surface, or both.

For optical applications, especially where the assembly comprises a lens or other device that is intended to transmit light, it is desirable that all parts of the assembly that lie within the field of view should be index-matched in terms of their refractive index over the spectral range of interest. Thus, where the one or more bending control members comprise one or more parts (e.g., struts, levers, linkages, disks, etc.) that are disposed within the area enclosed by the membrane, these parts should be index-matched to the fluid, so that they are invisible or hardly visible.

Suitably, as disclosed above, the membrane may be covered with a first protective cover plate that overlays the membrane. For optical applications, the front cover plate may be transparent and, in some embodiments, may comprise a fixed lens, i.e. a lens of fixed focal length.

The assembly may comprise a second cover plate juxtaposed the other opposite wall of the fluid-filled envelope. In some embodiments, said other wall may comprise a second deformable membrane. Alternatively, the other wall may have a constant shape, for example planar. Where the other wall of the envelope is flexible, a second cover plate may be arranged to overlay the other wall to protect it and to provide a rigid or substantially rigid housing for the assembly. Said second plate may, in some embodiments, also comprise a fixed lens. In yet another embodiment, the second cover plate may form the other wall of the envelope.

In yet another aspect of the present invention there is provided an article of eyewear comprising a deformable membrane assembly in accordance with the invention.

Said article of eyewear may typically comprise a frame with a rim portion; the deformable membrane assembly may be mounted within the rim portion.

Following is a description by way of example only with reference to the accompanying drawings of embodiments of the present invention.

In the drawings:

FIG. 17A is a schematic cross-sectional side elevation of the membrane assembly of FIG. 16 in an un-actuated state;

FIG. 17B is a schematic cross-sectional side elevation of the membrane assembly of FIG. 16 in an actuated state;

FIG. 18A is a schematic cross-sectional side view of part of a membrane assembly in accordance with a fifth embodiment of the invention in an un-actuated state;

FIG. 18B is a schematic cross-sectional side view of the part of the membrane assembly of the fifth embodiment of the invention in an actuated state;

FIG. 20A is a schematic cross-sectional side elevation of the membrane assembly of FIG. 19 in an un-actuated state;

FIG. 20B is a schematic cross-sectional side elevation of the membrane assembly of FIG. 19 in an actuated state;

FIG. 22A is a schematic cross-sectional side view of yet another membrane assembly in accordance with an eighth embodiment of the invention having "inboard" bending control linkages in an un-actuated state;

FIG. 22B is a schematic cross-sectional side view of the membrane assembly of the eighth embodiment of the invention in an actuated state;

FIG. 23 is a schematic cross-sectional side elevation of a membrane assembly in accordance with a ninth embodiment of the invention comprising "outboard" bending control linkages;

Figure 1:
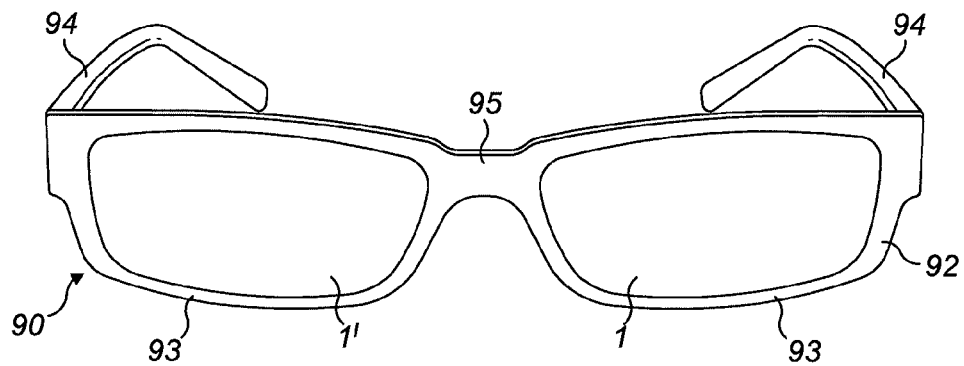
FIG. 1 is a perspective view from above of the front of a pair of eyeglasses comprising a frame that is fitted with two fluid-filled lens assemblies in accordance with a first embodiment of the present invention.
Figure 2:
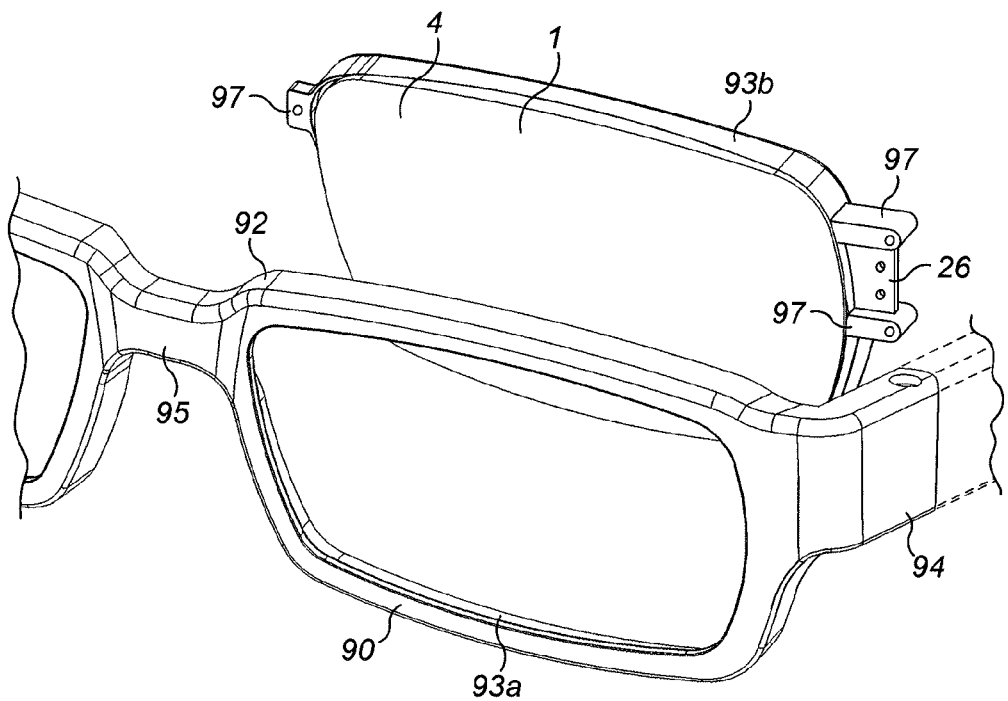
FIG. 2 is a perspective view from above and to the left of the left-hand side of the eyeglasses of FIG. 1 showing how one of the lens assemblies of the first embodiment is fitted to the frame.

As shown in FIG. 1, a pair of eyeglasses 90 (UK: spectacles) comprise a frame 92 having two rim portions 93 and two temples 94. The rim portions 93 are joined by a bridge 95, and each rim portion 93 is shaped and dimensioned to carry a respective lens assembly 1, 1' in accordance with a first embodiment of the present invention. One of the lens assemblies 1 is used for the left-hand side of the eyeglasses, and the other 1' is used for the right-hand side. Each rim portion 93 comprises a front rim part 93a that is formed integrally with the bridge 95 and is connected to the temples 94 and a separate rear rim part 93b. The front and rear rim parts 93a, 93b fit together as illustrated in FIG. 2 to trap and fixedly retain the respective lens assembly 1, 1' between them. The front and rear rim parts 93a, 93b may be fixed together by any suitable means available to the person skilled in the art. For instance, the front and rear rim parts may be formed with matching screw holes 97 that are adapted to receive small fixing screws for holding the two rim parts securely together and to retain the lens assembly 1, 1' therebetween.

As can be seen from FIG. 1, the right-hand and left-hand lens assemblies 1, 1' are mirror images of each another, their construction being otherwise identical. Only the left-hand lens assembly 1 is described in detail below, but it will be appreciated that the construction and operation of the right-hand side assembly 1' is substantially the same.

Figure 3:
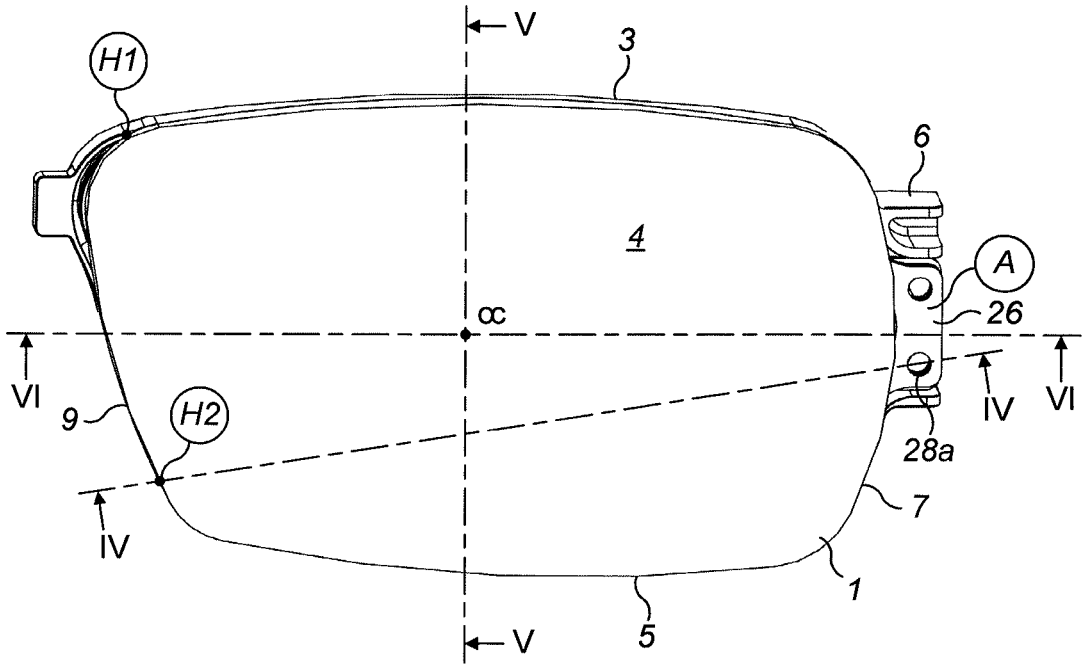
FIG. 3 is a front elevation of the one lens assembly of FIG. 2 in an un-actuated state.
Figure 9:
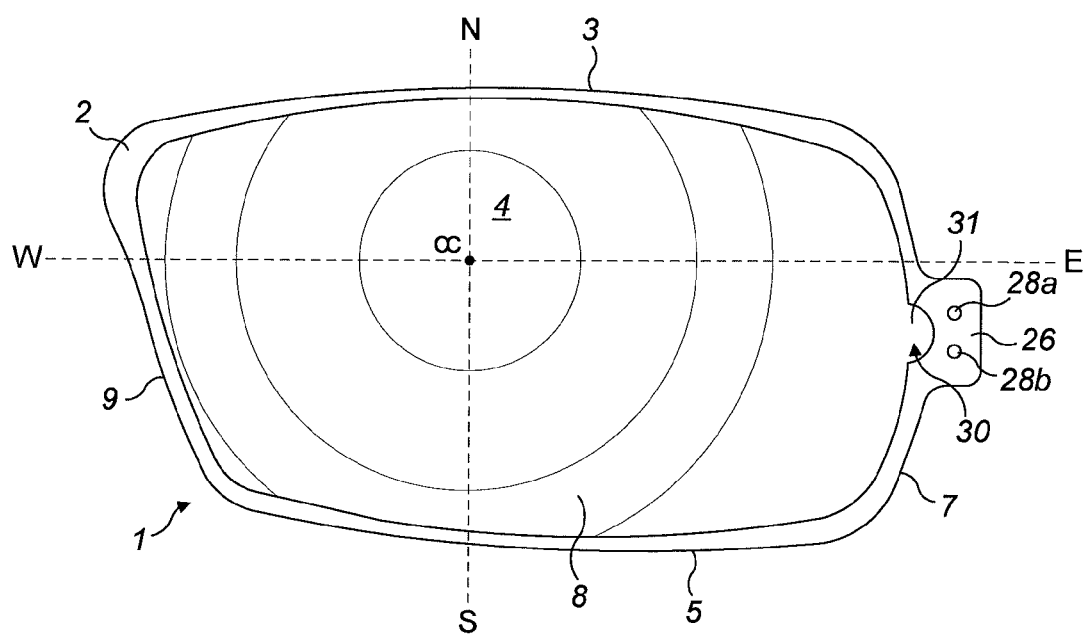
FIG. 9 is a front elevation of the flexible membrane and membrane supporting rings of the one lens assembly in an actuated state, showing how the width of the rings varies round the periphery of the membrane to control the second moment of area of the rings; contour lines are included to indicate the curvature of the membrane when actuated.

As best seen in FIGS. 3 and 9, in the present embodiment, the left-hand lens assembly 1 has a generally rectangular shape with two opposing long sides 3, 5 and two short sides 7, 9 and is designed to fit with the frame 92 as described above, but it will be appreciated that the shape of the lens assembly shown is only one example of a suitable shape, and a deformable membrane assembly, such as a lens assembly, according to the invention may be given a wide variety of different shapes. The invention is especially suited for non-round shapes such as the one shown in FIGS. 3 and 9, but the teachings of the invention are also applicable to round lenses and other devices that include a deformable membrane to provide a surface having a predefined form.

Figure 6:
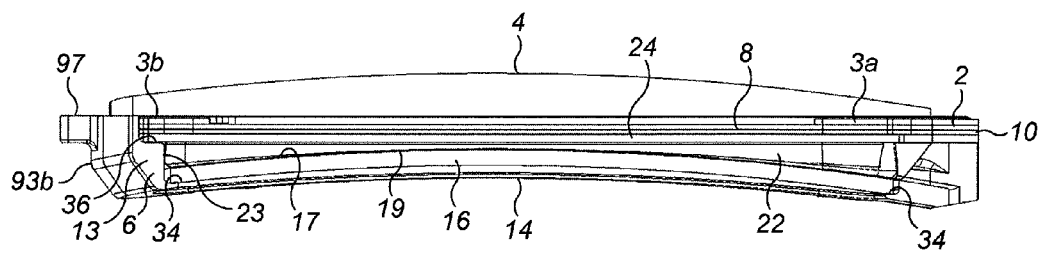
FIG. 6 is a cross-section of the one lens assembly along the line VI-VI of FIG. 3.
Figure 7:
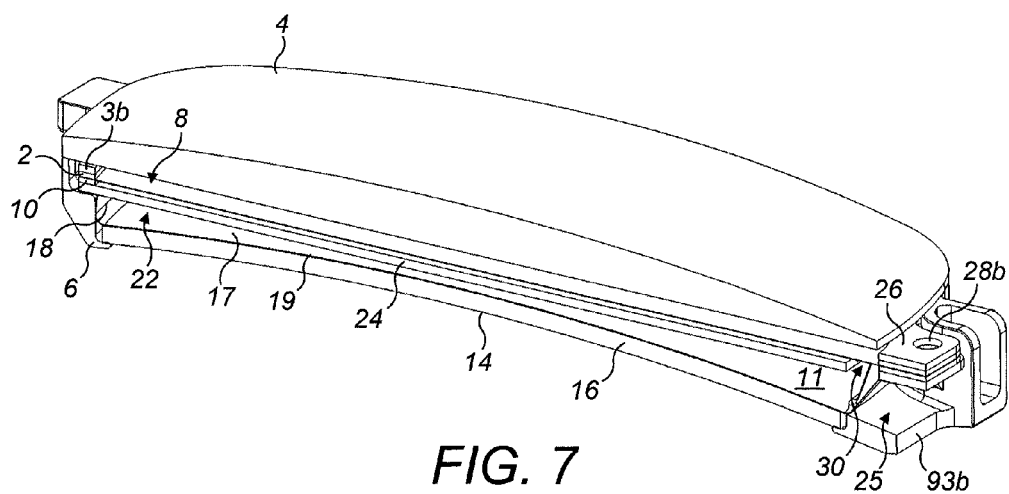
FIG. 7 is a perspective view from below and to the left of the front of the one lens assembly which is shown cutaway along the line VI-VI of FIG. 3.
Figure 8:
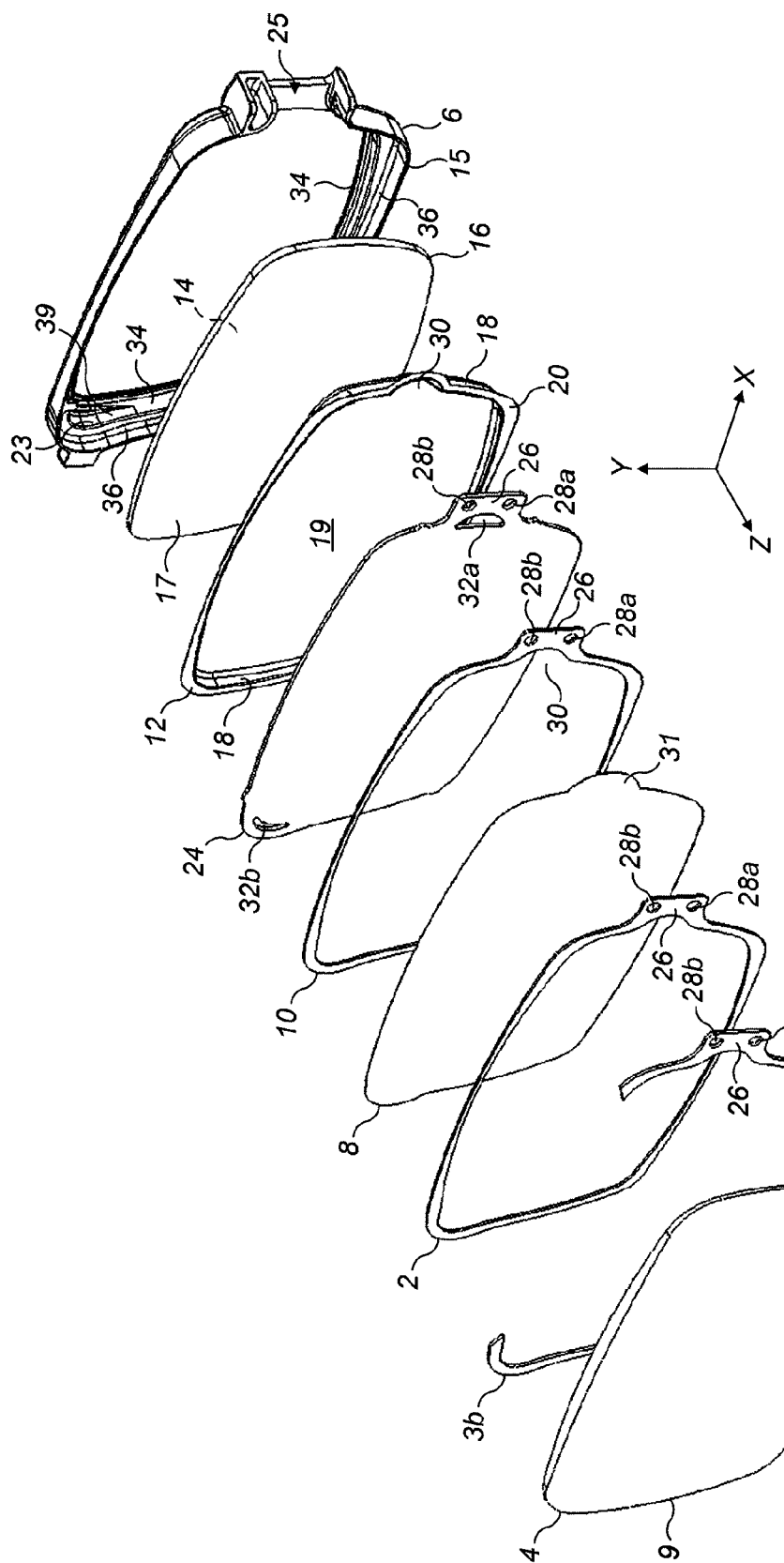
FIG. 8 is an exploded view of the one lens assembly of the first embodiment, showing the parts of the assembly.

As illustrated in FIGS. 5-8, the lens assembly 1 of the first embodiment comprises a transparent front cover plate 4, a transparent rear cover plate 16 and a retaining ring 6, which serves to hold the parts of the lens assembly 1 together, with the front and rear cover plates 4, 16 being spaced apart on the front-rear axis—the z axis as shown in FIG. 8.

Figure 4:
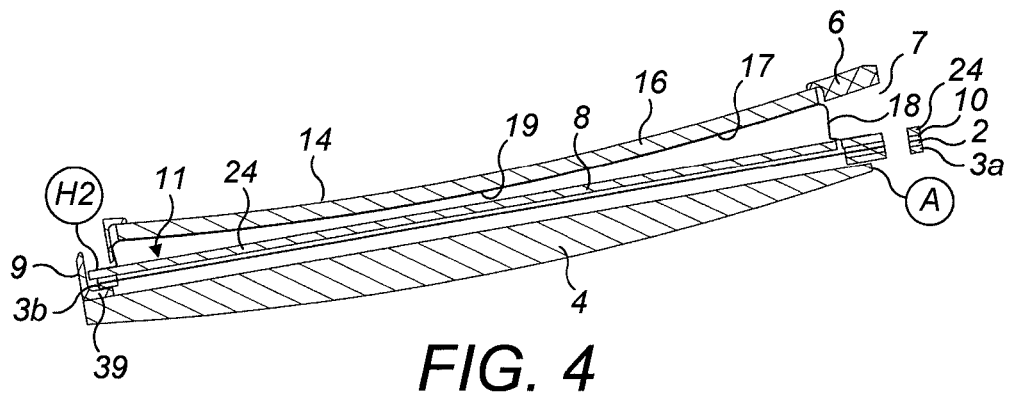
FIG. 4 is a cross-section of the one lens assembly along the line IV-IV of FIG. 3.
Figure 5:
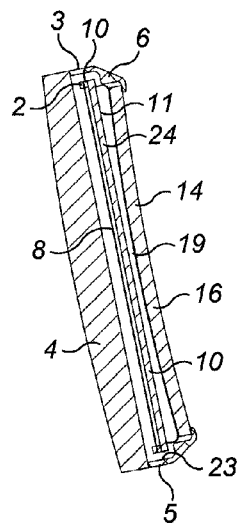
FIG. 5 is a cross-section of the one lens assembly along the line V-V of FIG. 3.

The front cover plate 4 may be of glass or a suitable transparent polymeric material. In the lens assembly 1 of the present embodiment, the front cover plate is about 1.5 mm thick, but this may be varied. In some embodiments, the front cover plate 4 may comprise a lens of fixed focal power(s), for example a single vision (single power), multifocal (two or more powers), progressive (graded power) or even an adjustable element. As shown in FIG. 4, for example, in the present embodiment, the front cover plate 4 is plano-convex.

The rear cover plate 16 has a front face 17 and a rear face 14 and may be made of glass or transparent polymer. In the present embodiment, the rear cover plate 16 is about 1.5 mm thick, but this may be varied as desired. As with the front cover plate 4, in some embodiments, the rear cover plate 16 may form a lens of a fixed focal power. In the present embodiment, for example, the rear cover plate 16 is a meniscus lens, as best seen in FIG. 4.

As shown in FIG. 8, the retaining ring 6 comprises a forwardly extending side wall 13 having an inner surface 23, which side wall 13 terminates in a front face 15. On one short side 7 of the lens assembly 1, the retaining ring 6 is formed with a slot 25 as shown in FIGS. 7 and 8 which extends in the front-rear direction. As best seen in FIG. 6, the inner surface 23 of the retaining ring 6 is formed with a circumferential, inwardly directed rear flange 34 and is stepped outwardly intermediate the front face 15 to form a circumferential shoulder 36 which is shaped as described in more detail below. The rear flange 34 is disposed proximate the rear of the retaining ring 6; the rear cover plate 16 is seated on the rear flange 34, and the front cover plate 4 sits on and is bonded to the front face 15 of the retaining ring 6, so that the lens assembly 1 constitutes a sealed unit defining an interior void.

As best seen in FIG. 6, the retaining ring 6 is shaped and dimensioned to be received snugly within the rear rim part 93b, so that when the lens assembly 1 is trapped between the front and rear rim parts 93a, 93b, it is held stably without movement. The retaining ring 6 thus forms a stable fixed support for the movable parts of the lens assembly 1, as described below.

At two spaced locations (H)1, (H)2 on the other short side 9 of the lens assembly 1, the inner surface 23 of the retaining ring 6 is formed integrally with small ring-engaging formations 39 that are spaced forwardly of the intermediate shoulder 36—see FIG. 4. Alternatively one or more of the formations may be disposed on the long sides 3, 5 proximate the other short side 9.

Within the void, the lens assembly 1 accommodates a dish-shaped part 12 having a flexible side wall 18, a rear wall 19 and a forward sealing flange 20. In the present embodiment, the dish-shaped part 12 is made of transparent DuPont® boPET (biaxially-oriented polyethylene terephthalate) and is about 6μ thick, but other suitable materials for the dish-shaped part may be used and the thickness adjusted accordingly. The rear wall 19 of the dish-shaped part 12 is bonded contiguously to the front face 17 of the rear cover plate 16. For this purpose, a transparent pressure-sensitive adhesive (PSA) such, for example, as 3M® 8211 adhesive may be employed. In the present embodiment, a layer of PSA of about 25μ thickness is used, but this may be varied as required.

The side wall 18 of the dish-shaped part 12 extends forwardly of the rear wall 19, and the intermediate shoulder 36 on the inner surface 23 of the retaining ring's 6 side wall 13 and the side wall 18 of the dish-shaped part 12 are configured and dimensioned such that in the vicinity of the formations 39, the forward sealing flange 20 of the dish-shaped part is locally supported on the shoulder 39, while elsewhere the side wall 12 stands proud of the shoulder 36 to leave a free space between the shoulder 36 and the sealing flange 20. In the present embodiment the side wall 18 of the dish-shaped part 12 is of substantially uniform height in the front-rear direction, and the shoulder 36 on the inner face 23 of the side wall 13 of the retaining ring 6 slopes rearwardly from the other short side 9 towards the one short side 7 of the assembly. This arrangement allows the dish-shaped part to be compressed in the region of the one short side 7 when actuated, as described in more detail below.

Figure 13A:
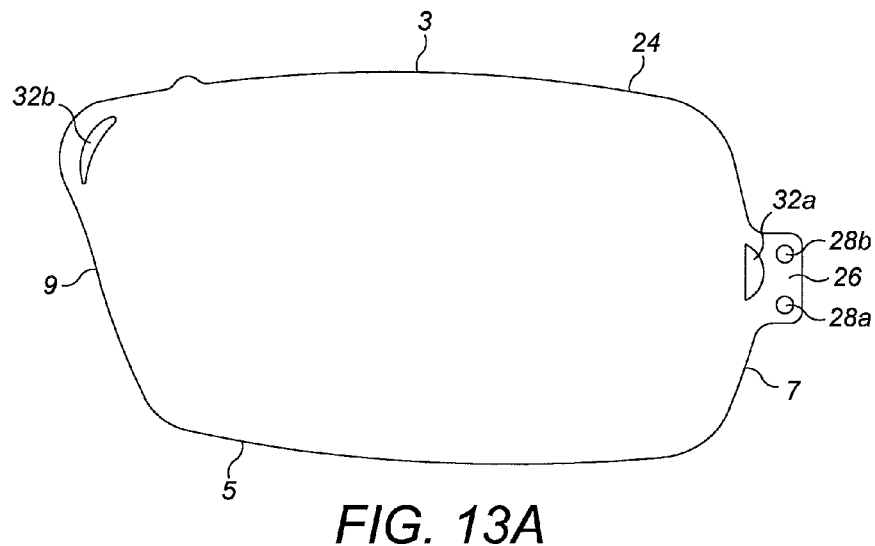
FIG. 13A is a front elevation of the support disk of the one lens assembly of the first embodiment that is used to control the bending of the membrane supporting rings under surface tension in the membrane.

The forward sealing flange 20 of the di part 12 is bonded to the rear surface of a transparent diaphragm comprising a disk 24 that serves as a bending control member, as described in more detail below. In the present embodiment, as best shown in FIG. 13A, the disk 24 comprises a flat plate of polycarbonate having a thickness of about 0.5 mm, but suitable alternative materials that provide the required properties described below may be used instead. Juxtaposed the one short side 7 of the lens assembly 1, the transparent disk 24 has a protruding tab 26 which fits within the slot 25 formed in the side wall 13 of the retaining ring 6. As best seen in FIG. 13A, the transparent disk 24 is formed with a plurality of apertures 32a, 32b; in the present embodiment there are two—one adjacent the one short side 7 of the lens assembly 1, and the other adjacent the other short side 9. The purpose of these apertures 32a, 32b is described in more detail below. The precise number, size and arrangement of the apertures 32a, 32b may be varied as desired—for example a plurality of smaller apertures spaced across the disk 24 may be provided. In the present embodiment, the dish-shaped part 12 is sealingly adhered to the rear surface of the disk 24 using Loctite® 3555 adhesive, but suitable alternatives will be known to those skilled in the art.

The front surface of the transparent disk 24 is sealed to a membrane sub-assembly comprising a transparent, non-porous, elastic membrane 8 that is sandwiched between a pair of resiliently bendable membrane supporting rings comprising a front ring 2 and a rear ring 10. As shown in FIGS. 6 and 7, the rings 2, 10 are of substantially the same geometry as each other and are dimensioned such that they are received within the interior void of the retaining ring forwards of the shoulder 36. In the present embodiment, the rings 2, 10 are cut from a sheet of stainless steel and are about 0.3 mm thick, but other materials may be used and the thickness adjusted accordingly to provide the desired stiffness.

The shape of the rings 2, 10 is shown in more detail in FIG. 9. As can be seen, the width of the rings 2, 10 in the x-y plane varies round the periphery of the assembly 1, such that the rings 2, 10 have a bending stiffness which varies in a predetermined manner round their extent. This is to provide for bending of the supporting rings 2, 10 when the assembly 1 is actuated to control deformation of the flexible membrane 8 and hence the power of the lens as described in more detail below.

In the present embodiment, the front and rear supporting rings 2, 10 have the same thickness, but in other embodiments they may have different thicknesses. For instance, the front supporting ring 2 may have a thickness of about 0.4-0.5 mm, while the thickness of the rear ring 10, may have a thickness of about 0.025-0.05 mm. The rear ring 8 also serves to space the membrane 8 from the disk 24. Regardless of whether the front and rear supporting rings 2, 10 have the same thickness or different thickness as one another, it is desirable that they should act together to balance the torsional forces applied to the rings 2, 10, optionally in combination with the transparent disk 24, when the membrane 8 is tensioned as described in more detail below. In some embodiments, the bending stiffness of the disk 24 may be sufficient to balance the torsional forces, in which case the rear ring 10 may be made thinner than the front ring 2 or even omitted. In the latter situation, the disk may incorporate on its front surface a peripheral step or the like to space the disk 24 from the membrane 8.

Each of the rings 2, 10 is formed with a protruding tab 26 which aligns with the corresponding tab 26 on the transparent disk 24.

In the present embodiment, the membrane 8 is made of polyethylene terephthalate (e.g. Mylar®) and is about 0.5 mm thick, but alternative materials with a suitable modulus of elasticity may be used as desired. For instance, the membrane 8 may alternatively be made of other polyesters, silicone elastomers (e.g. poly(dimethylsiloxane)), thermoplastic polyurethanes (e.g. Tuftane®), vinylidene chloride polymers (e.g. Saran®) or glass of suitable thickness.

The membrane 8 is pre-tensioned to a strain of up to about 5% and bonded to the rings such that it is stably supported around its edge as shown in FIGS. 4-7, 9 and 10. In the present embodiment, the membrane 8 is adhered to the front and rear rings 2, 10 using Loctite® 3555 adhesive. The membrane 8 should form a fluid-tight seal with at least the rear ring 10.

As shown in FIGS. 4, 6 and 7, the front ring 2 is bonded along its short sides 7, 9 respectively to two stiffening ribs 3a, 3b, which serve to modify the bending stiffness of the membrane sub-assembly in those regions. The stiffening rib 3a juxtaposed the one short side 7 of the lens assembly 1 is formed with a protruding tab 26 which aligns with the corresponding tabs 26 formed on the front and rear rings 2, 10 and the transparent disk 24.

The spacing between the shoulder 36 and the formations 39 on the inner surface 23 of the retaining ring 6 is such that the laminated disk 24, front and rear rings 2, 10, membrane 8 and stiffening rib 3b on the other short side 9 of the assembly 1 fit snugly beneath the ring-engaging formations 39 on the inner surface 23 of the retaining ring 6, which formations 39 thus serve to restrain the membrane sub-assembly from forwards or backwards movement at those locations $(H)1$, $(H)2$. As mentioned above, at the one short side 7 of the assembly and along the long sides 3, 5, at least proximate the one short side, the disk 24 and the rings 2, 10 with the membrane 8 sandwiched therebetween are free to move on the Z-axis in free space between the shoulder 36 and the front cover 4.

Figure 10:
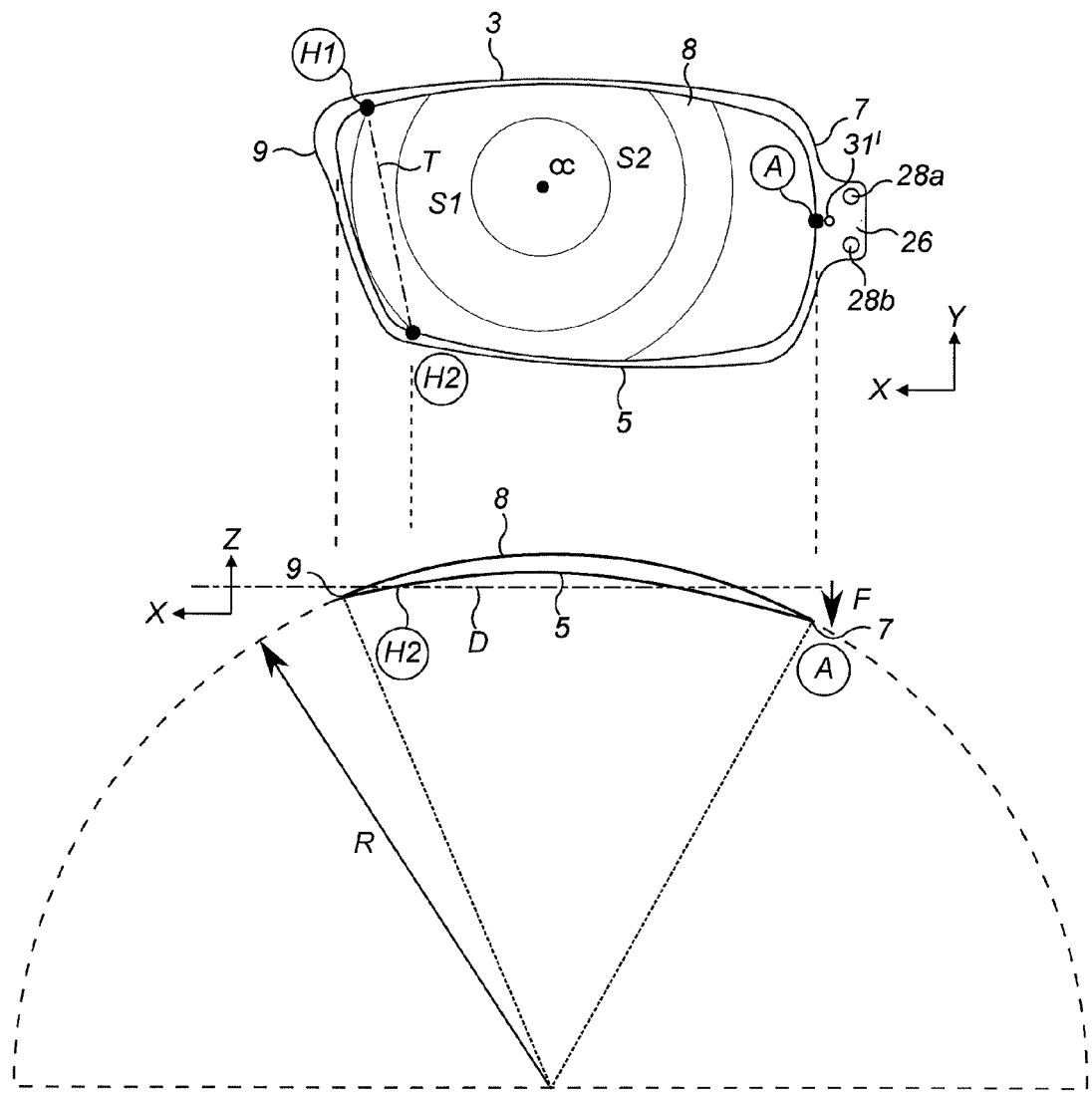
FIG. 10 shows the membrane and rings of FIG. 9 in the actuated state projected onto a notional sphere of radius R.

The ring-engaging formations 39 thus serve to hinge the membrane sub-assembly to the retaining ring juxtaposed the other short side 9. The aligned tabs 26 formed on the stiffening rib 3a, front and rear rings 2, 10 and transparent diaphragm 24 are formed with closely adjacent holes 28a, 28b for connection to a selectively operable actuation device (not shown) that is mounted to the eyeglasses 90 for moving the membrane sub-assembly in the front-rear direction at the one short side 7 relative to the retaining ring 6, the slot 25 in the retaining ring 6 permitting such movement. The holes 28a, 28b thus define an actuation point $(A)$ as shown in FIG. 10. Displacement of the membrane sub-assembly on the z-axis at the actuation point $(A)$ causes the portion of the membrane sub-assembly juxtaposed the one short side 7 of the assembly 1 to move towards or away from the rear wall 19 of the dish-shaped part 12 which is held stably by the retaining ring 6, while the sub-assembly is also held immobile relative to the rear wall 19 locations $(H)1$, $(H)2$, which serve as hinge points. The rings 2, 10 "float" freely in the free space between the shoulder 36 on the front cover 4, except where they are pinched between the ring-engaging formations 39 and the shoulder 36, and where their movement is controlled at the actuation point $(A)$ by the actuation device.

Any suitable actuation device known to those skilled in the art may be employed for selectively displacing the membrane sub-assembly at the actuation point $(A)$ relative to the retaining ring 6 between an un-actuated position as shown in FIGS. 4-7 in which the front and rear rings 2, 10 and membrane 8 are substantially planar in the x-y plane and a fully actuated position. The actuation device may be manually or automatically operable and should comprise a suitable ring-engaging linkage for connecting the actuation device to the membrane sub-assembly via the tabs 26 for driving the membrane sub-assembly in the front-rear direction at the actuation point $(A)$. The actuation device may provide for continuous displacement of the membrane sub-assembly between the un-actuated and fully actuated positions or may be adapted to provide movement of the membrane sub-assembly only to a plurality of predetermined mutually spaced positions. The actuation device may conveniently be housed in the bridge 94 of the eyeglasses 90 or in one or both of the temples 93. A separate actuation device for each lens assembly 1, 1' may be provided in each respective temple 93, and the devices may optionally be linked to provide simultaneous actuation of the two assemblies 1, 1'. It will be appreciated that the force applied by the actuation device acts on the membrane sub-assembly and reacts against the retaining ring 6 through the formations 39, which retaining ring 6 is mounted fixedly within the frame 92 of the eyeglasses 90, so as selectively to move the membrane support and assembly relative to the retaining ring 6. The actuation device is not described in detail herein, but in general terms may be mechanically, electrically or magnetically operated and/or may involve use of a phase change material, e.g. a shape memory alloy (SMA), wax or an electro-active polymer.

The side wall 13 of the retaining ring 6 is dimensioned such that when assembled, the cover plate 4 is spaced forwardly of the front membrane supporting ring 2 and stiffening ribs 3a, 3b, as shown in FIGS. 4, 5, 11 and 12, so that the membrane 8 may distend forwardly when actuated as described below without impinging on the front cover plate 4.

The dish-shaped part 12, membrane 8, the rear supporting ring 10 and diaphragm 24 define a sealed interior cavity 22, which is filled with a transparent fluid. In the present embodiment, the cavity 22 is filled with transparent oil 11. In the present embodiment, Dow Corning DC 705 silicone oil (1,3,5-trimethyl-1,1,3,5,5-pentaphenyltrisiloxane having a molecular weight of 546.88) is used, but variety of other suitable colourless oils are available, especially in the family of high refractive index siloxane oils for which there are a number of manufacturers. The oil 11 should be chosen so as not be harmful to a wearer's eye in the event of a leakage. For non-optical applications, this is less of a concern.

The cavity 22 should not normally be over-filled, so that in the un-actuated position, the membrane 8 remains flat as described above, defining a datum plane D as shown in FIG. 10 for the membrane, with the pre-tension in the membrane 8 serving to stretch the membrane to reduce the risk of undesired wrinkles or sagging owing to temperature changes, gravity or inertial effects in the oil 11 when the assembly 1 is moved. As mentioned above, the transparent diaphragm 24 is formed with apertures 32a, 32b, which permit the fluid to flow between the front and rear of the transparent diaphragm 24 during filling and during operation as described below.

Although the membrane 8 is planar in the un-actuated position in accordance with the present embodiment, in other embodiments the membrane may be convex (or concave) when un-actuated and may adopt a planar configuration when actuated. In such case the plane of the membrane when actuated may be used conveniently to define a datum reference plane D for measuring displacement of the rings 2, 10 or other supporting member(s) on the z-axis. In yet another alternative, the assembly may be configured such that in practice it is never planar, and yet it may have a theoretical planar configuration that is an extrapolation of its permitted movement—either in the direction of actuation or de-actuation. Those skilled in the art will understand that even such a theoretical planar state may be used to define a datum plane for the membrane, even where in the actual un-actuated state the membrane already has a degree of curvature.

The oil 11 serves to support the dish-shaped part 12 from within, and in particular reinforces the flexible side wall 18 to prevent it from collapsing under its own weight or inertial effects within the assembly. The fluid filled cavity 22 thus forms a cushion like, resiliently compressible envelope.

In the present embodiment, the transparent oil 11 and the materials used to make the rear cover plate 16, the dish-shaped part 12, the pressure-sensitive adhesive for bonding the rear wall 19 of the dish-shaped part 12 to the front surface 17 of the rear cover plate 16, the transparent diaphragm 24 and the membrane 8 are all chosen to have an index of refraction as close as possible to one another. With the interior cavity 22 filled with transparent oil 11, the membrane 8 and the rear face 14 of the rear cover plate 16 form the opposite optical surfaces of an adjustable lens. As described above, in the present embodiment the rear cover plate 16 is a meniscus lens.

In the un-actuated state, the membrane is planar, so the lens has a fixed optical power afforded by the rear cover plate 16, with zero addition from the membrane 8. It will be understood that for non-optical applications, the fluid, along with the other parts of the assembly do not need to be transparent and may be opaque or semi-transparent as desired.

It will be appreciated that the present invention is not limited to the particular materials and dimensions used for the present embodiment, which are given only by way of example. Different types of materials may suitably used for the dish-shaped part 12 that are optically clear, have low overall stiffness compared with the supporting rings 2, 10 and are joinable to the diaphragm 24. Different adhesives may be chosen that are able to join the parts of the assembly durably, are creep resistant, are of practical viscosity and remain inert in the presence of the fluid 11. Particular adhesives may be chosen in dependence on materials selected for the various parts.

Figure 11:
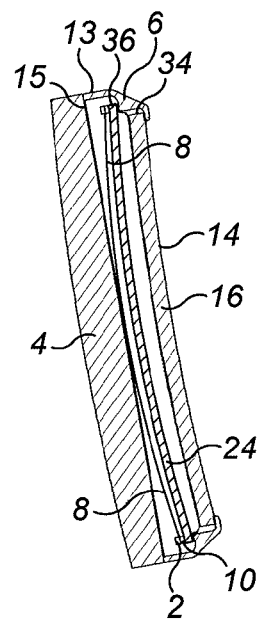
FIG. 11 is a cross-section of the one lens assembly corresponding to FIG. 4 but showing the assembly in an actuated state.
Figure 12:
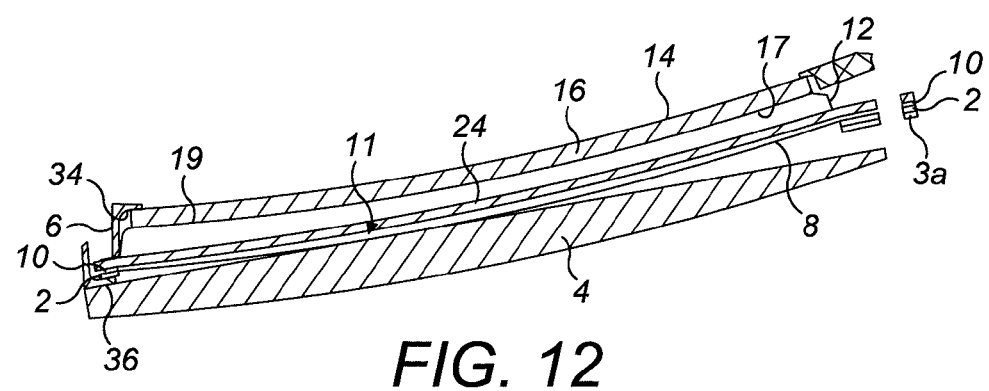
FIG. 12 is a cross-section of the one lens assembly corresponding to FIG. 5 but showing the assembly in an actuated state.

On operating the actuation device, force is applied to the tabs 26 on the membrane sub-assembly which causes the membrane sub-assembly at the one short side 7 of the assembly 1 to move forwards or rearwards from its un-actuated position relative to the retaining ring 6, with the tabs 26 sliding in the slot 25 formed in the one short side 7 of the retaining ring 6 to permit this, thereby expanding or compressing the cavity 22 and respectively decreasing or increasing the fluid pressure within the cavity 22. The side wall 18 of the dish-shaped part 12 is flexible to allow this movement. In the present embodiment, the lens assembly 1 is designed to move the membrane sub-assembly rearwards adjacent the one short side 7 upon actuation to compress and increase the fluid pressure in the cavity 22. The increased fluid pressure has the effect of causing the elastic membrane 8 to inflate and protrude forwardly in a convex form as shown in FIGS. 11 and 12, thereby increasing the curvature of the membrane and the optical thickness of the lens between the membrane 8 and the rear face 14 of the rear cover plate 16 and adding positive optical power to the fixed meniscus lens of the rear cover plate 16.

It will be appreciated that in other embodiments, e.g. the fourth embodiment described below with reference to FIGS. 16-17, the actuation device could be set up to move the sub-assembly forwards from the un-actuated position, which would decrease the fluid pressure in the cavity 22, causing the membrane 8 to distend inwardly in a concave form such that, in combination with the rear face 14 of the rear cover plate 16, the composite lens would be bi-concave, although in the present embodiment, the maximum curvature in the rearwards direction would be limited by the clearance between the membrane 8 and the transparent diaphragm 24. The greater the curvature of the membrane 8, the greater the additional optical power (positive or negative) afforded by the membrane 8. In such an embodiment, the flexible side wall 18 of the dish-shaped part 12 would be compressed in the un-actuated position and would expand when actuated.

For use as a lens assembly, the membrane 8 is required to deform spherically upon actuation, or according to another predefined form as described below. Other predefined forms may be desired for different optical or non-optical applications of a deformable membrane assembly in accordance with the present invention. Since the membrane 8 is non-round, the membrane supporting rings 2, 10 must bend so as to deflect on the z-axis normal to the planar datum during actuation of the assembly in order to control the shape of the membrane 8 when distended to the predefined form. In particular, the membrane supporting rings 2, 10 must bend to match the profile of the edge of the membrane 8 when the membrane 8 has the predefined form. If the membrane supporting rings 2, 10 were insufficiently flexible, or did not bend correctly, then upon actuation of the assembly 1, the edge of the membrane 8 would not match the predefined form of the membrane 8, and the overall shape of the membrane 8 would be distorted as a result.

FIG. 10 illustrates the profile of the edge of the membrane 8 of the present embodiment that is required when the lens assembly 1 is actuated to give the membrane 8 a substantially undistorted spherical form, the contours of the spherical form and its optical centre OC at the vertex being shown in FIGS. 9 and 10 in long dashed lines. In the lower half of FIG. 10 the membrane is shown in solid lines projected onto a notional sphere which is shown in short dashed lines. By way of comparison, the membrane in its planar un-actuated state is also shown in the lower half of the figure in chain-dotted lines. The plane of the membrane in its un-actuated state represents the datum plane D for describing the actuation of the assembly 1 of the present embodiment. If the membrane 8 were circular, and spherical deformation of the membrane 8 were required on actuation, then the supporting rings 2, 10 could be rigid, since the edge of the membrane 8 would remain circular and planar in all positions between the un-actuated position and the fully actuated position. However, for spherical deformation of the membrane 8 of the lens assembly 1 of the present embodiment, the supporting rings 2, 10 must bend on actuation as shown in FIG. 10 to avoid distortion of the membrane shape. The bending that is required is particularly pronounced along the long sides 3, 5.

In order to achieve the desired bending of the supporting rings 2, 10, the rings must be flexible to allow them to adopt to the desired profile, and their bending stiffness varies round their extent, so that under the influence of the increased surface tension in the membrane 8 upon actuation of the membrane assembly 1, the rings 2, 10 respond non-uniformly round their extent, causing or allowing them to bend in the predetermined manner. In the present embodiment, the variation in bending stiffness is achieved by varying the width of the rings 2, 10 round their extent as described above with reference to FIG. 9.

The actual variation in width of the supporting rings 2, 10 that is required to obtain the desired variation in bending stiffness round the rings, as described above, is calculated by finite element analysis (FEA) as described in PCT/GB2012/051426. For quasi-static or low frequency optical and other applications, static FEA may be employed adequately. However, in other embodiments, where the surface is intended for acoustic applications for instance, dynamic FEA may be appropriate. As those skilled in the art will be aware, FEA—whether static or dynamic—involves numerous iterations performed using a computer with the input of selected parameters to calculate the membrane shape that would result in practice with an increasing force F applied at the actuation point Ⓐ as shown in FIG. 10. The element shape may be selected to suit the calculation being performed. For the design of the rings 2, 10 of the present embodiment, a tetrahedral element shape has been found to be suitable. The selected parameters to be input include the geometry of the supporting rings 2, 10, the geometry of the membrane 8, the modulus of the membrane 8, the modulus of the rings 2, 10, including how the modulus of the rings varies round the rings (which may be defined empirically or by means of a suitable formula), the modulus of the disk 24, the amount of pre-tension in any of the parts, the temperature and other environmental factors. The FEA programme defines how the pressure applied to the membrane 8 increases as load is applied to the rings at the actuation point Ⓐ.

In order to design precisely the rings 2, 10 for optical use, the output of the FEA analysis is approximated to the desired shape of the membrane as defined by one or more Zernike polynomial functions of the general formula $Z_n^{\pm m}$. In the present embodiment, a spherical Zernike function is used, but higher spherical order functions can also be used if desired, by creating a shape that is the sum of a number of Zernike polynomials.

The FEA output is correlated with the selected Zernike function across the membrane 8 to see how well the FEA output approximates to the desired shaped as defined by the selected function. Depending how well the FEA output and selected function correlate with one another, the relevant parameters of the lens can be adjusted to achieve a better fit on the next iteration. By seeing how well the simulated deformation of the membrane 8, as calculated by FEA, approximates to the desired surface shape as described by the selected Zernike polynomial function, the person skilled in the art can see how well the chosen supporting ring 2, 10 parameters perform. It is possible to determine which regions of the supporting rings 2, 10 need to be tuned (or which other parameters should be adjusted) to improve the correlation of the FEA output and the selected function that approximates to the predefined form.

The above-described iterative process is carried out over a number of different lens powers, so that a lens whose power varies continuously with deformation of the supporting rings 2, 10 (and the force F applied at the actuation point Ⓐ) can be designed. The supporting rings 2, 10 are designed to bend variably by deflection on the z-axis round their extent and with respect to the adjustment in lens power required. The variation in width of the supporting rings 2, 10 in the x-y plane, perpendicular to the z-axis of the assembly 1, round their extent can also be adjusted for different lens shapes, taking into account the locations of the hinge points Ⓗ1, Ⓗ2 and actuation point Ⓐ relative to the desired optical centre OC.

Once the shape of the membrane 8 has been calculated by FEA as described above, the optical properties of the membrane 8 as an optical lens surface may be determined by suitable optical ray tracing software (e.g. Zemax™ optical software available from Radiant Zemax, LLC of Redmond, Wash.) using the calculated membrane shape.

Since the profile of the membrane supporting rings 2, 10 when actuated must conform to the profile of the edge of the membrane 8 in the predefined form, the hinge points Ⓗ1, Ⓗ2 where the supporting rings 2, 10 are held stationary are selected to correspond to points where the rings 2, 10 are not displaced relative to the planar datum D upon actuation of the assembly 1. In order to avoid distortion of the membrane shape on actuation, the hinge points Ⓗ1, Ⓗ2 should ideally be positioned on a single circular contour relative to the optical centre OC as shown in FIG. 10, but in practice the positions of the hinge points Ⓗ1, Ⓗ2 may depart slightly from the same contour without undue distortion of the final membrane form. In the present embodiment there are two hinge points Ⓗ1, Ⓗ2, but in other embodiments there may be more hinge points, provided they all placed on or close to the same contour relative to the optical centre. In yet another alternative, there may be no hinge points, provided there are at least three actuation points as mentioned below.

Similarly, the actuation point Ⓐ where the rings 2, 10 are displaced actively on the z-axis by the actuation device to cause compression of the cavity 22 are chosen so that the actual displacement of the rings 2, 10 at the actuation point Ⓐ at each position between the un-actuated and fully actuated positions is equal or substantially equal to the displacement of the rings 2, 10 at the actuation point Ⓐ that is needed for the edge of the membrane 8 to have the same profile as the edge of the membrane 8 in the predefined form. In the present embodiment, only one actuation point Ⓐ is provided, but in some embodiments there may be a plurality of actuation points, depending upon the complexity of the membrane edge profile that is needed to achieve the desired predefined form.

Design rules for the position of the control points—i.e., the actuation points and hinge points—where force is applied to the rings 2, 10 are disclosed in co-pending application no. PCT/GB2012/051426, the contents of which are incorporated herein by reference. In general, however, there should be at least three control points to define the plane of the membrane 8, and further there should be a control point at or proximate each point on the rings 2, 10 where the profile of the rings 2, 10 that is needed to produce the predefined form upon deformation of the membrane 8 exhibits a turning point in the direction of the force F applied at the control point between two adjacent points where the profile of the ring exhibits an inflection point or a turning point in the opposite direction.

In the present embodiment, the one short side 7 of the rings 2, 10 substantially follows one of the circular contours of the membrane 8, and so hardly needs to bend along its length, if at all. In fact, in the present embodiment, the stiffening rib 3a serves to stiffen the one short side 7 of the supporting rings 2, 10, so that the actuation point Ⓐ can be positioned substantially anywhere convenient along the one short side 7 with an acceptably small amount of distortion of the shape of the membrane 8 when actuated.

As described above, the membrane supporting rings 2, 10 must bend on the z-axis upon actuation of the lens assembly 1. The supporting rings 2, 10 are sufficiently flexible to allow such bending in response to the incremental surface tension in the membrane 8 when the assembly is actuated, but as well as desired bending in a predetermined manner to control the shape of the membrane 8 upon actuation, the flexible supporting rings 2, 10 are also vulnerable to uncontrolled bending, which should be avoided in order to maintain the fidelity of the membrane shape. In particular, while the supporting rings are configured to bend relative to the planar datum D on actuation, they are also liable to in-plane bending within the datum plane, even when the assembly is not actuated. This in-plane bending is controlled in accordance with the present invention.

As described above, the membrane 8 of the present embodiment is pre-tensioned across the supporting rings 2, 10 in the un-actuated state to a strain of up to about 5% to reduce or eliminate sagging or wrinkling of the membrane. In some embodiments an even greater pre-tension may be used if needed, for instance up to 10% or even 15% or 20%. This pre-tension acts on the supporting rings 2, 10 and, without support, the rings would be susceptible to uncontrolled in-plane bending. Further, upon actuation of the assembly 1, the pressure of fluid 11 within the cavity 22 changes, causing the membrane 8 to distend. The surface tension in the membrane 8 thus increases, and additional stress is applied to the supporting rings 2, 10, increasing the risk of unwanted distortion in the desired shape of the supporting rings 2, 10.

In the lens assembly of the first embodiment described herein, the transparent disk 24 serves to support the membrane sub-assembly. Upon actuation of the assembly 1, the support disk 24 is sufficiently flexible to bend with the membrane supporting rings 2, 10 on the z-axis relative to the datum plane D, but serves to reinforce the rings 2, 10 against unwanted in-plane bending on the x- or y-axes. The disk 24 serves to stiffen the supporting rings 2, 10 in the x-y plane, but does not significantly increase the out-of-plane stiffness of the rings on the z-axis, thereby allowing the rings to deflect on the z-axis relative to the datum plane to adopt the desired profile that is needed to produce the predefined form of the membrane 8 upon actuation. By stiffening the supporting rings 2, 10 in the x-y plane, the rings 2, 10 are reinforced against bending or other deformation in the x-y plane under the influence of the surface tension in the membrane 8 which acts on the rings when un-actuated and actuated.

In the present embodiment the support disk 24 is made from polycarbonate, but in other embodiments the diaphragm may suitably be made from a fibre material having suitable stiffness in the x-y plane, but little stiffness in the z-direction owing to the orientation of the fibres.

The disk 24 of the present embodiment has a substantially uniform in-plane stiffness, but in some embodiments a diaphragm may be used which is stiffer in the N-S direction than in the E-W direction, and this directional stiffness may be used to compensate further for the differential strain in the membrane 8 when actuated.

In order to achieve satisfactory deformation of the membrane 8, it is desirable to maintain substantially uniform surface tension within the membrane 8. For optical applications, such as the lens assembly 1 of the present embodiment, this is a factor in ensuring good optical quality of the lens. In the case of an assembly in which the membrane is longer in one dimension in the x-y plane than it is in the other dimension, as for example in the case of the generally rectangular lens assembly 1 of the present embodiment, the supporting rings 2, 10 are usually required to bend more along the longer axis than they are along the shorter axis in order to produce the desired membrane form upon actuation. In the present embodiment, the supporting rings 2, 10 are deflected on the z-axis more along the E-W axis upon actuation, as shown in FIG. 9, than they are along the N-S axis. This differential bending of the supporting rings 2, 10 may introduce a small degree of anisotropy to the surface tension within the membrane 8, since the membrane 8 is strained more in the E-W direction than it is in the N-S direction. However, the support disk 24 bends in the z-direction predominantly along one axis—the E-W direction— and this tends to increase the out-of-plane stiffness of the supporting rings 2, 10 along the other N-S axis. The bending of the supporting rings 2, 10 along the E-W direction has the effect of bringing the short sides 7, 9 of the supporting rings 2, 10 closer together, while stiffening the supporting rings 2, 10 against similar bending inwards in the N-S direction, which has the effect of attenuating the strain on the membrane 8 in the E-W direction whilst maintaining the strain on the membrane 8 in the N-S direction, thereby tending to rebalance the surface tensions in the membrane 8 in the E-W and N-S direction. This is a small effect however, especially since the pretension strain is significantly greater than the incremental actuation strain, and in some embodiments it may be more desirable to maintain uniform out of plane stiffness of the support disk in the E-W and N-S directions.

The fluid-filled dish-shaped part 12, with its flexible side wall 18, and membrane sub-assembly 2, 8, 10 form a resilient cushion-like envelope. Upon compressing the cavity 22 by means of the actuation device, the pressure of the fluid 11 within the cavity 22 is progressively increased relative to ambient pressure, causing the elastic membrane 8 to distend. Similarly, in other embodiments the cavity 22 may be expanded causing the fluid pressure to decrease relative to ambient pressure. Upon releasing the force applied by the actuating device at the actuation point Ⓐ the assembly automatically resiliently reverts to its un-actuated state.

Figure 13B:
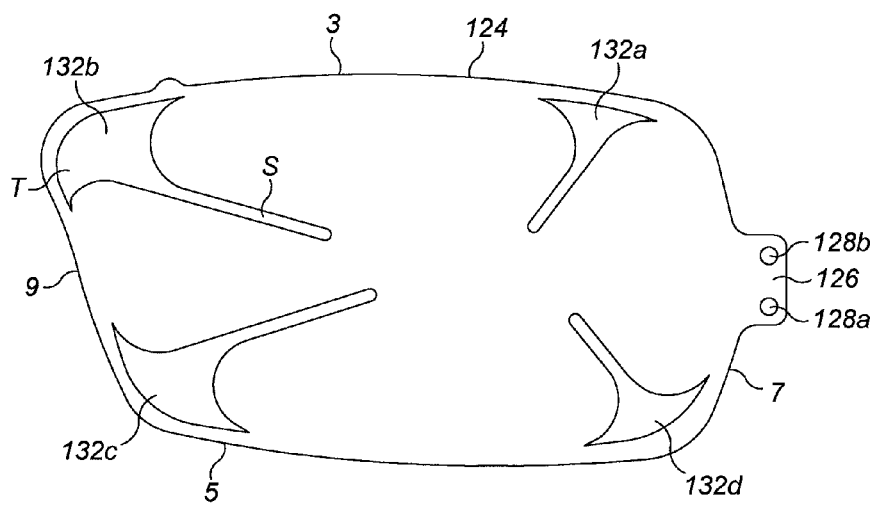
FIG. 13B is a front elevation of a first variant of the support disk that may be substituted in the assembly of the first embodiment.

FIG. 13B shows a first variant support disk 124 that may be substituted for the support disk 24 described above in the lens assembly 1 of the first embodiment of the present invention. The first variant support disk 124 has the same outline shape as the support disk 24, so that it may replace the support disk 24 within the interior void of the assembly 1 that is defined by the retaining ring 6 and the front and rear cover plates 4, 16. The first variant support disk 124 comprises a protruding tab 126 for engagement with the actuation device in the manner described above. However, instead of two smaller apertures 32a, 32b, the first variant support disk 124 comprises four large apertures 132a, 132b, 132c, 132d, each of which has a shape similar to that of an arbelos ("shoemaker's knife"), with a generally triangular cut-out portion T adjacent the edge of the support disk 124, and an elongated stem portion S that extends generally towards the centre of the disk 124. As can be seen from FIG. 13B, each aperture 132a, 132b, 132c, 132d is positioned generally towards a respective corner of the support disk 124 between a respective one of the long sides 3, 5 and an adjacent short side 7, 9. The overall pattern of the apertures 132a, 132b, 132c, 132d is such that the first variant support disk 124 has a generally "cloverleaf" shape.

The first variant support disk 124 may be made from the same materials and have the same thickness as the support disk 24 shown in FIG. 13A, but the effect of the larger apertures 132a, 132b, 132c, 132d in the configuration described above is to "decouple" the bending of the first variant support disk 124 along the x- and y-axes, so that unlike the support disk 24 described above, out-of-plane bending of the first variant support disk 124 along the E-W direction does not significantly affect the bending stiffness of the support disk 124 along the N-W direction. In some embodiments, this may be desirable in order to ensure that the support disk remains able to bend freely out-of-plane with the supporting rings 2, 10.

Figure 13C:
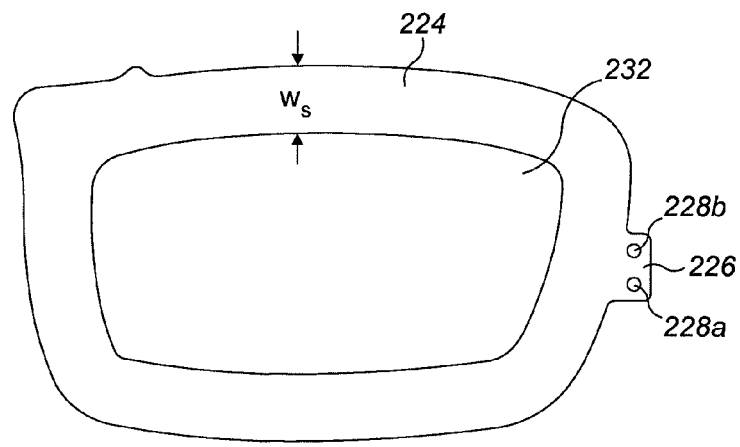
FIG. 13C is a front elevation of a second variant of the support disk that may be substituted in the assembly of the first embodiment.

A second variant support disk 224 shown in FIG. 13C. The second variant support disk 224 is also shaped and dimensioned to be substituted in the lens assembly 1 of the first embodiment described above for the support disk 24, and comprises a protruding tab 226. The second variant support disk 224 comprises a large central aperture 232, such that the second variant support disk 224 has a generally annular shape. In the present embodiment, the second variant support disk 224 has a substantially uniform width $w_s$ round its extent as shown in FIG. 13C. The effect of the large central aperture 232 on the second variant support disk 224 is the same as the four large apertures 132a, 132b, 132c, 132d of the first variant support disk 124, namely to decouple the bending of the second variant support disk 224 in the E-W and N-S directions to maintain substantially uniform out of plane bending stiffness of the second variant support disk 224 on the z-axis during actuation of the assembly 1.

Figure 14:
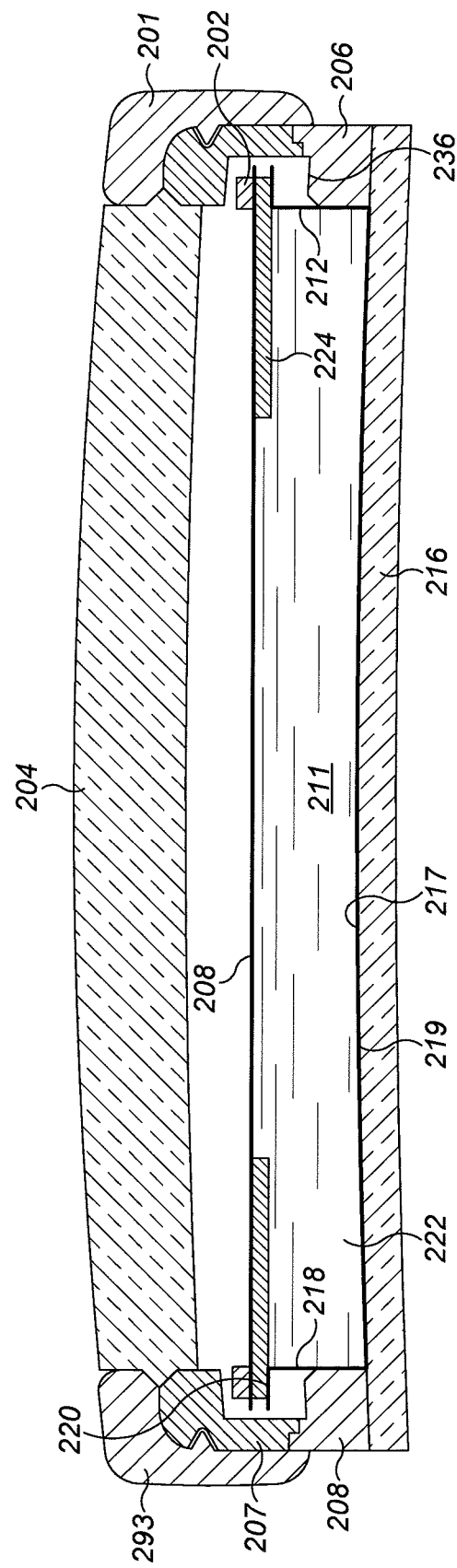
FIG. 14 is a schematic cross-sectional view, similar to FIGS. 4 and 11, of another membrane assembly in accordance with a second embodiment of the invention, which includes the second variant support disk of FIG. 13C.

FIG. 14 shows in cross-section another schematic membrane assembly 201 in accordance with a second embodiment of the invention, which is fitted with the second variant support disk 224. The lens assembly 201 comprises a retaining ring 206, which is formed in two parts—front and rear parts 207, 208—a front cover plate 204 and a rear cover plate 216. The construction of the membrane assembly 201 is broadly similar to the construction of the lens assembly 1 of the first embodiment described above, and may use similar materials for corresponding parts, and is not described in detail herein.

The rear cover plate 216 is bonded to a rear face of the rear part 207 of retaining ring 206. The front and rear parts 207, 208 are bonded together, and the front cover plate 204 is bonded to the front part 207 to form a sealed unit. The assembly is fitted within a frame part 293 which, together with the front part 207 of the retaining ring 206, forms a bezel for the front cover plate 204

The front and rear cover plates 204, 216 and retaining ring 206 of the membrane assembly 201 define an interior void which accommodates a flexible dish-shaped part 212 having a flexible side wall 218 and a rear wall 219. The rear wall 219 of the dish-shaped part 12 is bonded to the front face 217 of the rear cover plate 216, and the side wall 218 of the dish-shaped part 212 has a forward sealing flange 220 to which is bonded the second variant support disk 224. The two parts of the retaining ring 206 define an internal shoulder 236, and the forward sealing flange 220 is spaced forwardly of the shoulder 236.

The second variant support disk 224 is bonded round its outer periphery to the rear face of an elastic membrane 208 which forms a sealed cavity 222 with the dish-shaped part 212, the cavity 222 being filled with fluid 211. The forward face of the membrane 208 is bonded to a bendable membrane supporting ring 202. The membrane assembly 201 of the second embodiment has only a single membrane supporting ring 202, with the rear face of the membrane 208 being bonded directly to the second variant supporting disk 224 as described above. In some embodiments (not shown), the disk 224 may be spaced from the membrane by means of a suitable spacer ring to allow fluid to interpose between the disk 224 and the membrane 208 across substantially its entire extent, thereby to prevent "peeling" of the membrane from the disk 224. However, it will be appreciated that the second embodiment could equally well comprise front and rear supporting rings in a manner similar to the lens assembly 1 of the first embodiment. The membrane 208 is pre-tensioned across the membrane supporting ring 202 as described above.

In order to actuate the membrane assembly 201 of the second embodiment, the dish-shaped part 212 is compressed using a suitable actuation device (not shown) in order to reduce the volume of the cavity 222, thereby increasing the pressure of the fluid 211 within the cavity and causing the membrane 208 to distend forwardly as described above in relation to the first embodiment. The actuation device is arranged to apply a force to the membrane supporting ring 202 and support disk 224 (via tab 226) as described in relation to the first embodiment. The supporting ring 202 is hinged to the retaining ring 206 at one or more locations where the ring is not displaced out-of-plane upon actuation. The actuation point and hinge points have been omitted from FIG. 14 for clarity.

Although FIG. 14 is not drawn to scale, the width $w_s$ of the second variant supporting disk 224 may range from about 2-10 times the width of the membrane supporting ring 202 in order to provide sufficient reinforcement of the membrane-supporting ring 202 against in-plane distortion from the surface tension in the membrane 208. It will be appreciated that the precise ratio of the width of the supporting ring 202 to the width $w_s$ of the supporting disk 224 may vary round the supporting ring 202 owing to the variation in width of the supporting ring 202 to provide the predetermined variation in out-of-plane bending upon actuation.

The support disk 24 of the lens assembly 1, and the first and second variant support disks 124, 224, reinforce the membrane supporting ring or rings 2, 10; 202 against in-plane deformation, while permitting out of plane bending of the rings in the predetermined manner to achieve the predefined form of membrane 8, 208. In some embodiments, however, the membrane sub-assembly may suffer from a further problem of buckling. Owing to the surface tension in the membrane, some configurations of the membrane and supporting ring may exhibit a degree of instability, exhibiting a tendency to buckle out-of-plane to form a hyperbolic paraboloid shape, notwithstanding the additional in-plane stiffness afforded by the support disk. This problem may be particularly apparent when the membrane is planar, for instance in the un-actuated state, where any deviation from flatness releases some of the surface tension and is therefore favoured. However, buckling may also occur when the assembly is actuated, for instance in embodiments where the membrane has a planar form when actuated, although the effect tends to diminish as the membrane is progressively distended. Whilst buckling of this kind may not be an issue, or at least a significant issue, in some embodiments of the invention, in other embodiments the support disk may be adapted to provide a degree of stability against such buckling as described below.

Figure 13D:
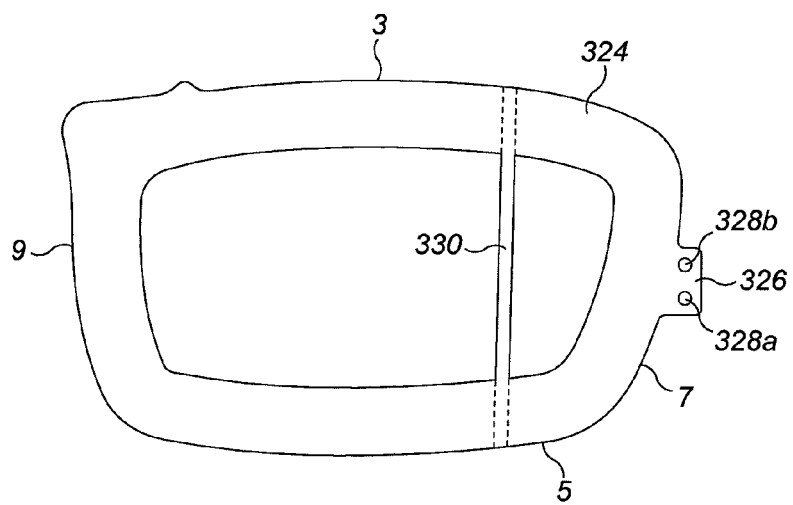
FIG. 13D is a front elevation of a third variant of the support disk that may be substituted in the assembly of the first embodiment.
Figure 13E:
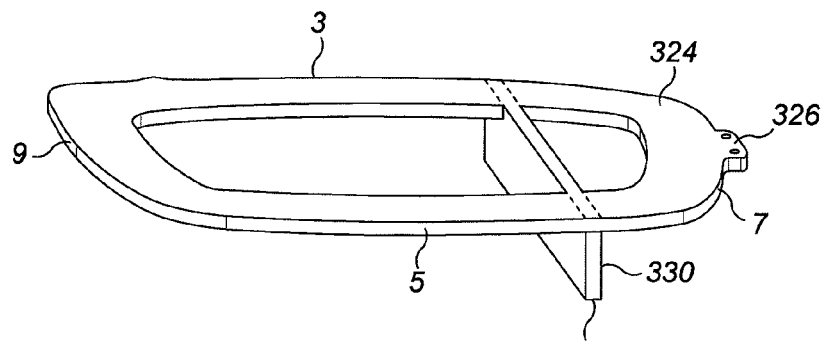
FIG. 13E is a perspective view from below and to the right-hand side of the front of the third variant support disk of FIG. 13D.

Thus, FIGS. 13D and 13E show a third variant support disk 324 which may be substituted for the support disk 24 in the membrane assembly 1 of the first embodiment or the second variant support disk 224 in the membrane assembly 201 of the second embodiment, which third variant support disk 324 is similar to the second variant support disk 224, with the addition of a rearwardly protruding, transverse flange 330 which extends across the support disk 324 from one long side 3 to the other long side 5. In the present embodiment, the flange 330 is formed integrally with the support disk 324, but in other embodiments it may be made separately and bonded to the rear face of the support disk 324 before assembly of the membrane assembly. The flange 330 extends rearwardly from the support disk 324 and terminates in a rear face 332. The flange 330 is shaped and dimensioned to engage with and immovable part of the membrane assembly 1; 201 to stabilise the membrane sub-assembly against buckling of the kind described above. In particular, in the present embodiment, the rear face 332 of the flange 330 may engage with the rear wall 19; 219 of the dish-shaped part 12; 212. In embodiments where the rear wall of the dish-shaped part 12; 212 is omitted, and the side wall of the dish-shaped part is bonded directly to the rear cover plate 16; 216, the rear face 332 of the flange 330 may engage directly on the front surface 17 of the rear cover plate 16; 216.

The flange 330 is joined to the support disk 324 at the long sides 3, 5 of the assembly at positions where the membrane sub-assembly is not displaced, or significantly displaced, out-of-plane upon actuation.

Figure 13F:
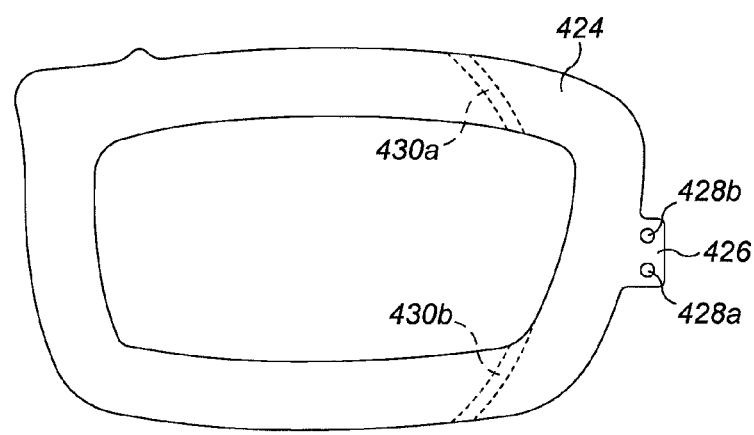
FIG. 13F is a front elevation of a fourth variant of the support disk that may be substituted in the assembly of the first embodiment.
Figure 13G:
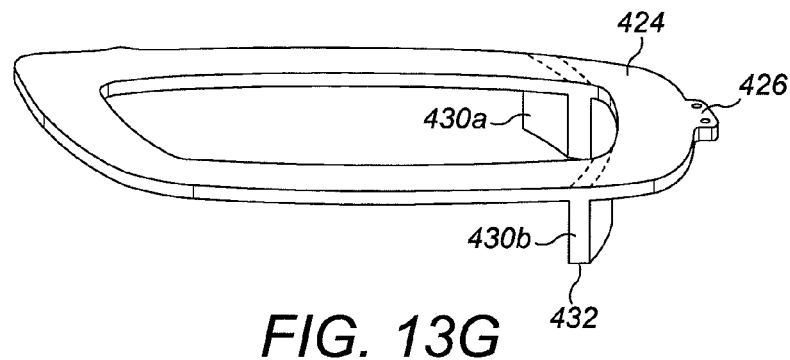
FIG. 13G is a perspective view from below and to the right-hand side of the front of the fourth variant support disk of FIG. 13F.

A fourth variant support disk 424 is shown in FIGS. 13F and 13G. The fourth variant support disk 424 is similar to the third variant support disk 324, except that instead of a single, substantially linear flange 330, the fourth variant support disk 424 includes two separate arcuate flanges 430a and 430b, each of which depends from a respective long side 3, 5 of the support disk 424 and terminates in a rear face 432. In this embodiment, the flanges 430a, 430b are curved in the x-y plane and substantially follow a contour where the membrane supporting ring 2, 10; 210 is not displaced out-of-plane upon actuation—see the contour lines illustrated in FIG. 9.

In the first and second embodiments of the invention described herein, the membrane supporting ring or rings 2, 10; 210 are stiffened against in-plane bending or distortion by means of a support disk 24; 124; 224; 324; 424. However, other embodiments of the invention comprehend alternative in-plane bending controllers. For instance, in some embodiments, the reinforcing diaphragm may comprise a reticulated sheet or a mesh or the like, that is joined to the supporting ring or rings 2, 10; 202 round substantially their whole extent in order to provide the desired in-plane stiffness. The diaphragm may be connected to the rings 2, 10; 202 substantially continuously or at spaced locations around its periphery provided that the load is distributed uniformly without giving rise to any significant local distortion of the rings or membrane 8; 208.

Figure 15:
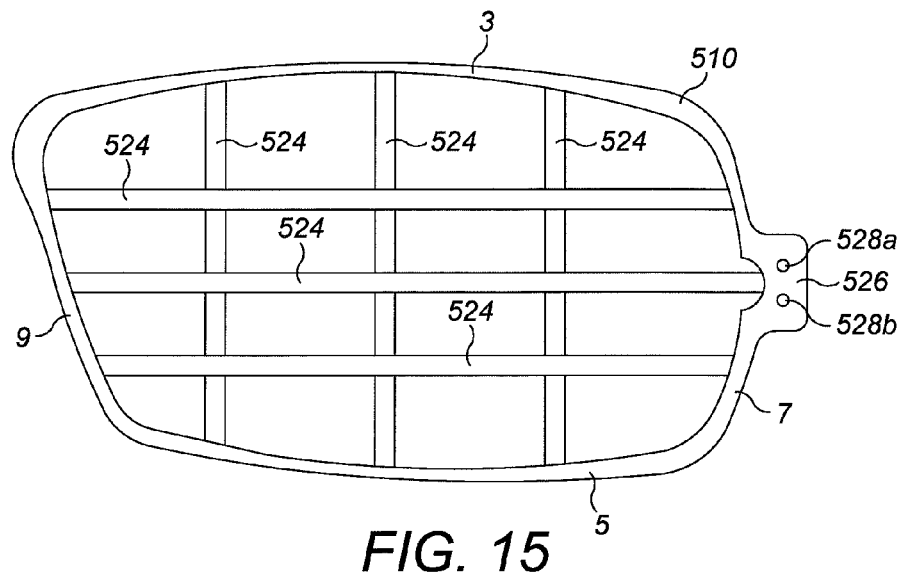
FIG. 15 is a schematic front elevation of a membrane supporting ring equipped with bending control struts in accordance with a third embodiment of the invention.

FIG. 15 shows a rear membrane supporting ring 510 in accordance with a third embodiment of the invention. The membrane supporting ring 510 has a similar shape to the rear membrane supporting ring 10 of the lens assembly 1 of the first embodiment as shown in, for example, FIG. 9, and the rear ring 510 of the third embodiment may be used in the lens assembly 1 in place of the ring 10 and support disk 24 described above. The rear supporting ring 510 of the third embodiment is laminated to a front supporting ring (not shown) of the kind used in the first embodiment, with a membrane (also not shown) sandwiched therebetween.

The rear membrane supporting ring 510 of the third embodiment is equipped with a plurality of inelastic struts 524 bonded to the ring 510 round its extent. Each strut 524 extends across the supporting ring 510 from one side to another. Two sets of struts are provided: one set extends vertically across the supporting ring 510 from one long side of the assembly 3 to the other long side 5, while the other set extends horizontally across the supporting ring 510 from one short side 7 to the other short side 9. Each strut 524 is bonded or otherwise fixedly secured at each end to the supporting ring 510, but the separate struts 524 are not connected to each other, so that upon actuation, the struts 524 can slide over one another as required. The struts 524 serve to stiffen the membrane supporting ring 510 in the x-y plane without significantly affecting its stiffness out-of-plane on the z-axis.

For optical applications, the inelastic struts should be transparent and preferably made from a material of the same refractive index as the fluid within the assembly, the membrane and the rear cover plate, so they are invisible to the user.

The support disks 24; 124; 224; 324; 424 and struts 524 hereinbefore described each resist bending of the membrane supporting rings 2, 10; 202 in the x-y plane, while allowing out-of-plane bending of the support rings; but in some embodiments, it may be desirable allow a degree of controlled in-plane "give" in the membrane supporting ring or rings. A number of limiting factors affect the design of the membrane assembly, including the pre-tension in the membrane, the actuation strain and the strength of the joint between the membrane supporting rings and the membrane. In some embodiments, a ring bending controller may be used to control the response of the supporting rings to increasing surface tension in the membrane to allow the supporting rings to bend by a controlled extent in the x-y plane upon actuation, thereby to afford a greater degree of curvature of the membrane 8 for a given actuation strain. It will be appreciated that such an arrangement may be advantageous in assemblies with circular membranes, as well as assemblies such as the present embodiment, with a non-circular membrane.

Figure 16:
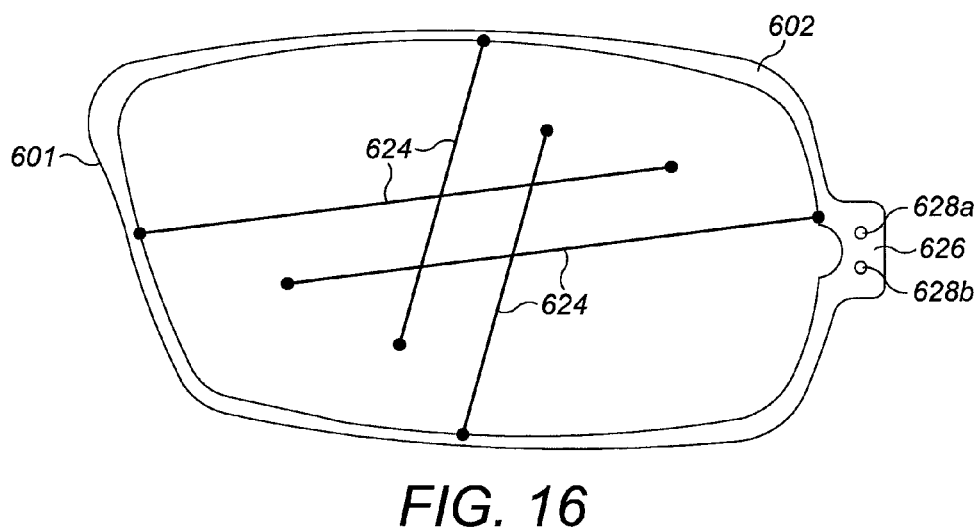
FIG. 16 is a front elevation of a membrane assembly in accordance with a fourth embodiment of the invention.

FIGS. 16, 17A and 17B thus show part of another membrane assembly 601 in accordance with a fourth embodiment of the invention which include such ring bending controllers that allow a degree of in-plane displacement of the membrane supporting rings upon actuation. As best seen in FIG. 17A, the assembly 601 of the fourth embodiment has a membrane sub-assembly comprising front and rear membrane supporting rings 602, 610 which sandwich a membrane 608 therebetween. The membrane 608 is pre-tensioned across the rings 602, 610 to avoid sagging, wrinkling etc. The rear membrane supporting ring 610 is bonded circumferentially to a forward sealing flange 620 of a dish-shaped part 612 having a rear wall 619 and a forwardly extending, flexible side wall 618. The rear wall 619 of the dish-shaped part 612 may be rigid or substantially rigid, or it may be flexible and supported by a rigid rear cover plate (not shown). The basic construction of the membrane assembly 601 is similar to the construction of the assemblies 1; 201 of the first and second embodiments described above, and is not described in more detail herein. As in the first and second embodiments, the dish-shaped part 612 and the membrane 608 form a sealed cavity 622 which is filled with fluid 611.

The operation of the membrane assembly 601 of the fourth embodiment of the invention is similar to the manner of operation of the membrane assemblies 1; 201 of the first and second embodiments, except the membrane assembly 601 of the fourth embodiment is actuated by expansion instead of compression. FIG. 17A shows the membrane assembly 601 in its un-actuated state with the membrane 608 planar; the side wall 618 of the dish-shaped part is partially collapsed. Upon actuation, the flexible side wall 618 is expanded and straightened to increase the volume of the cavity 622. This may be achieved by applying a force to the membrane supporting rings 602, 610 in the direction of the arrows in FIG. 17B while holding the rear wall 619 in a fixed position. This has the effect of reducing the pressure of the fluid 611 within the cavity 622, causing the membrane 608 to distend concavely inwards (rearwards).

In order to achieve the predefined form of the membrane 608 when actuated, the membrane supporting rings 602, 610 are bendable, and have a bending stiffness which varies round their extent as described above. However, the bendable nature of the supporting rings 602, 610 means they are vulnerable to uncontrolled in-plane bending also as described above. Accordingly, in the present fourth embodiment of the invention, the membrane sub-assembly is connected to a plurality of rigid, inelastic bending control levers 624. FIG. 16, which is a front elevation of the assembly 601, shows four bending control levers 624, but these are for illustration purposes only, and in practice as many bending control levers 624 may be used as are needed adequately to control the in-plane bending of the supporting rings 602, 610 round their extent.

Each bending control lever 624 is hinged at one end to the rear membrane supporting ring 610, or alternatively to the membrane 608 itself juxtaposed the supporting ring 610, and is hinged at its other end to the rear wall 619 of the dish-shaped part 612. Each bending control lever 624 is configured and arranged such that it subtends an acute angle with the plane of the membrane 608 when un-actuated (the planar datum as described above with reference to the first embodiment). Suitably, each bending control lever 624 subtends an angle of less than 45° to the planar datum, even when fully actuated. In this way, the bending control levers 624 serve to control the in-plane bending or other deformation of the membrane supporting rings 602, 610 without significantly affecting the out-of-plane displacement of the rings 602, 610.

It will be understood that since the bending control levers 624 are stiff, the end of each lever 624 where it is connected to the membrane sub-assembly follows a trajectory upon actuation which is an arc of a circle. In this way, upon actuation, the membrane supporting rings 602, 610 are caused or allowed to be displaced inwards in the x-y plane upon actuation, thereby modulating the strain applied to the membrane 608.

In a variant of the fourth embodiment, the assembly 601 may be configured such that the membrane is concave when un-actuated as shown in FIG. 17B and the assembly may be compressed to achieve actuation, with the membrane adopting a planar form as shown in FIG. 17A when actuated. In this variant, the plane of the membrane when actuated may be used to define a convenient datum for measuring the displacement of the membrane-supporting rings.

In accordance with a fifth embodiment of the invention, FIGS. 18A and 18B show part of a further variant of the membrane assembly 601 of FIGS. 16, 17A, 17B in which a plurality of bending control levers 724 are connected between the membrane sub-assembly, particularly a front membrane supporting ring 702, and the rear face of a front cover plate 706. The assembly of the fifth embodiment is arranged such that the fluid cavity (not shown) is compressed to achieve actuation, and the connection of the bending control levers 724 to the front cover plate 706 obviates the need for a rear cover plate which may be advantageous in some applications, especially to save space. For example, in lens applications, it may be desirable to omit a rear lens in order to make the overall assembly as thin as possible. The assembly of the fifth embodiment operates in a similar manner to that of the fourth embodiment in that the bending control levers 724 subtend an acute angle to the planar datum of the membrane 708 and so have no significant effect on the out-of-plane bending of the membrane supporting rings 702, 710, while controlling the in-plane displacement of the rings 702, 710 to cause or allow a small degree of controlled in-plane displacement upon actuation.

In accordance with the present invention, one or more bending controllers are provided for resisting or controlling in-plane displacement of membrane supporting ring or rings. The bending controllers resist in-plane deformation of the ring or rings owing to the pre-tension in the membrane, at least when the assembly is un-actuated. Upon actuation, when the surface tension in the membrane is increased incrementally, the one or more bending controllers may continue to resist in-plane displacement of the membrane supporting ring or rings, or it or they may allow a controlled degree of in-plane displacement as described above in relation to the fourth and fifth embodiments of the invention. In the first and second embodiments of the invention, a reinforcing diaphragm, or supporting disk 24; 224 is provided to control bending of the membrane supporting ring or rings, and in the third embodiment of the invention, the bending controllers comprise a plurality of struts 524 that extend across the membrane supporting rings. In the fourth and fifth embodiments of the invention, bending control levers 624; 724 are provided to allow a degree of controlled displacement of the membrane supporting ring or rings in the x-y plane. Various other kinds of bending controllers fall within the scope of the present invention as described in more detail below.

Figure 19:
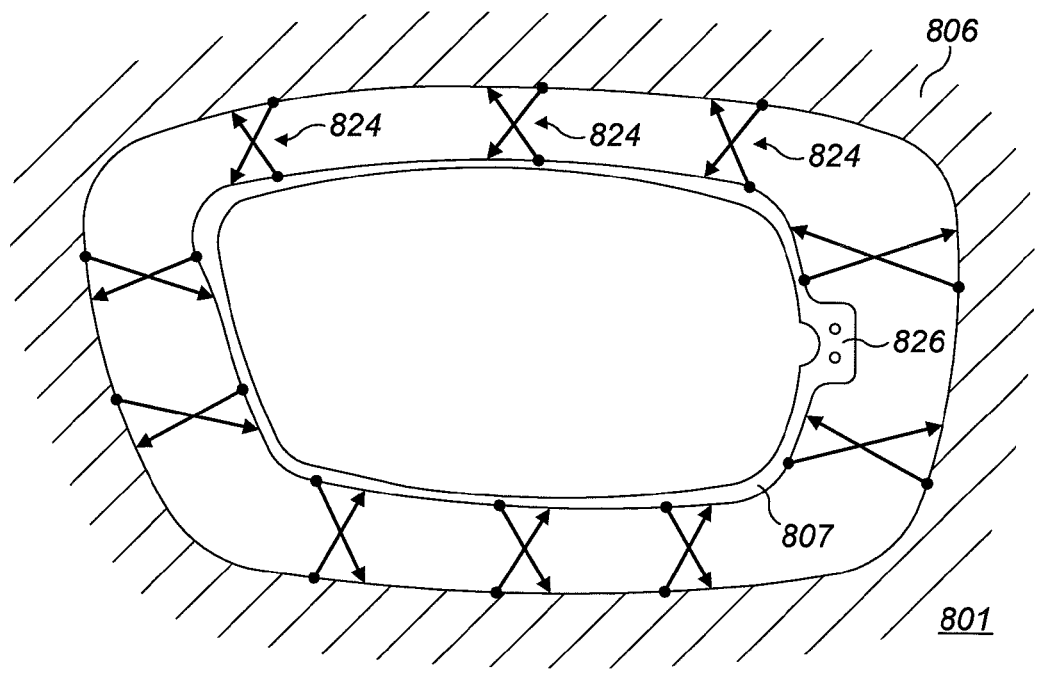
FIG. 19 is a schematic front elevation of another membrane assembly in accordance with a sixth embodiment of the invention comprising "outboard" bending control linkages.

Thus, FIGS. 19, 20A and 20B show a membrane assembly 801 in accordance with a sixth embodiment of the invention in which the bending controllers comprise a plurality of two-bar linkages 824 that are disposed circumferentially around the periphery of a membrane sub-assembly. With reference to FIG. 19, the membrane assembly 801 comprises an immovable supporting structure, which is illustrated schematically at 806. In some embodiments, the supporting structure 806 may comprise a housing, case, retaining ring or the like that houses and supports the movable parts of the membrane assembly 801. Within the supporting structure 806, the assembly 801 comprises a membrane sub-assembly comprising front and rear bendable membrane-supporting rings 802, 810, which sandwich a membrane 808 therebetween. Each membrane supporting ring 802, 810 is provided with a protruding tab 826 of the kind described above in relation to the first embodiment for attachment to a suitable actuation device (not shown). The membrane sub-assembly is supported on and bonded to a forward sealing flange 820 of a dish-shaped part 812 having a flexible side wall 818 and a rear wall 819 that is mounted on a rigid rear cover plate 816. Said rigid rear cover plate 816 may form part of the immovable structure 806. The membrane sub-assembly and the dish-shaped part 812 form a sealed envelope 822 that is filled with fluid 811.

In the un-actuated state as shown in FIG. 20A, the membrane 808 is flat, but upon actuation the side wall 818 of the dish-shaped part 812 is compressed to reduce the volume of the envelope 822, thereby causing the membrane 808 to inflate and distend forwards, as shown in FIG. 20B. The construction and operation of the assembly of the sixth embodiment is similar in most respects to the construction and operation of the fourth embodiment—except that it works by compression instead of expansion—and these are not described in more detail herein, but in-plane bending control of the membrane-supporting rings 802, 810 is provided by the two-bar linkages 824 instead of the bending control levers 624 of the fourth embodiment.

Each two-bar linkage 824 comprises two levers: one lever 825 is hinged at one end to the rear cover plate 816 or another part of the immovable support structure 806, and is connected slidably at its other end to the membrane sub-assembly, while the other lever 826 is hinged at one end to the membrane sub-assembly and is connected slidably at its other end to the rear cover plate 816 or other part of the immovable support structure 806. The two-bar linkages 824 are arranged to permit displacement of the membrane supporting rings 802, 810 on the primary bending axis to allow compression of the envelope 622 and to allow bending of the rings 802, 810 to control the profile of the edge of the membrane as described above, but the two-bar linkages 124 prevent in-plane movement of the rings 802, 810.

Figure 21:
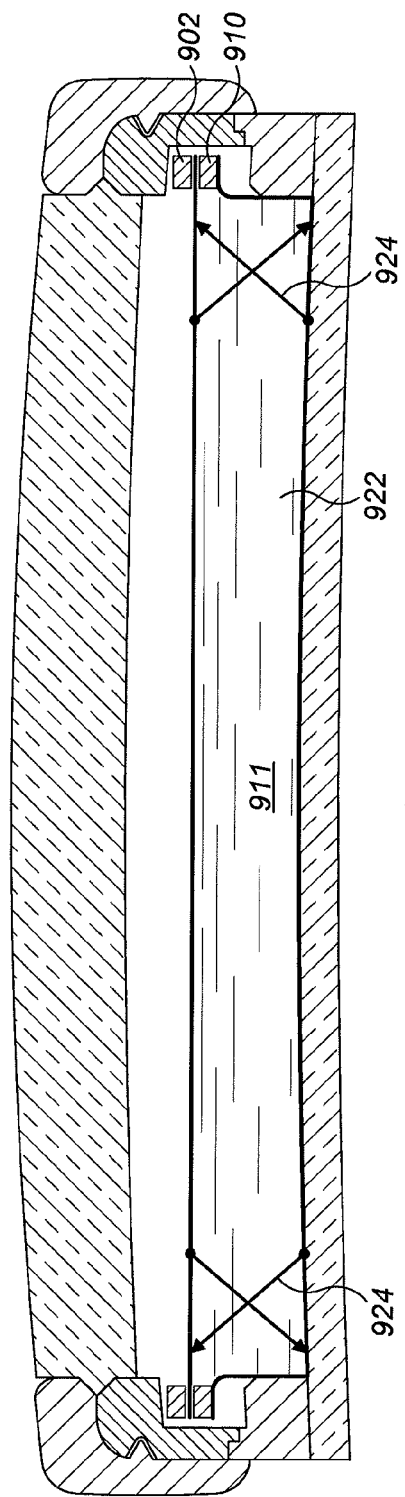
FIG. 21 is a schematic cross-sectional side elevation of a membrane assembly in accordance with a seventh embodiment of the invention comprising "inboard" bending control linkages.

In the sixth embodiment shown in FIGS. 19, 20A and 20B, the two-bar linkages 824 are disposed outside the membrane supporting rings 802, 810 in an "outboard" manner. An alternative arrangement in accordance with a seventh embodiment of the invention is shown in FIG. 21 where a plurality of two-bar linkages 924 are positioned within a fluid 911 within an envelope 922, "inboard" of membrane-supporting rings 902, 910. Apart from the inboard two-bar linkages 924, the construction and operation of the seventh embodiment of FIG. 21 is similar to the construction and operation of the second embodiment described above with reference to FIG. 14. As with the bending control struts 524 and levers 624; 724 of the third fourth and fifth embodiments of the invention described above, the two-bar linkages 924 disposed within the envelope 922 of the seventh embodiment should be index-matched with the fluid 911 for optical applications.

The two-bar linkages 824; 924 of the sixth and seventh embodiments of the invention are configured to allow out-of-plane deflection of the membrane sub-assembly, but to resist in-plane bending of the membrane supporting rings 802, 810; 902, 910. FIGS. 22A, 22B and 23 illustrate two embodiments of the invention comprising four-bar linkages 1024; 1124 which are similarly circumferentially spaced round a membrane sub-assembly, but are configured and arranged to permit out-of-plane deflection by bending of the membrane sub-assembly as well as controlled in-plane displacement in a manner analogous to the bending control levers 624; 724 of the fourth and fifth embodiments described above.

Thus, FIGS. 22A and 22B show schematically a membrane assembly 1001 in accordance with an eighth embodiment of the present invention, respectively in an un-actuated state and an actuated state. The membrane assembly 1001 of the eighth embodiment comprises front and rear membrane-supporting rings 1002, 1010 respectively, which sandwich a pre-tensioned membrane 1008 therebetween. The sub-assembly is bonded circumferentially to a forward facing flange 1020 of a dish-shaped part 1012 having a flexible side wall 1018 and a rear wall 1019 that is supported stably on a rear cover plate 1016. The dish-shaped part 1012 and membrane 1008 define a fluid-filled cavity 1022 which is filled with a suitable fluid 1011 such as silicone oil of the kind described above. In the un-actuated state is shown in FIG. 22A the membrane 1008 is flat. In order to actuate the assembly 1001, a suitable actuation device (not shown) is used to displace the rings 1002, 1010 at appropriate control points as described above to compress the cavity 1022 and increase the pressure of the fluid 1011 therein, thereby causing the membrane 1008 to inflate and distend forwardly as shown in FIG. 22B. As described above, the rings 1002, 1010 have a variable bending stiffness round their extent to control the shape of the edge of the membrane 1008 to produce a predefined form when the membrane is actuated.

Each four-bar linkage 1024 comprises a first lever 1025 which is hinged at one end to the rear membrane supporting ring 1010 (or alternatively directly to the membrane 1008 juxtaposed the rings 1002, 1010) and two other levers 1026, 1027 that are each hinged at one end to the first lever 1025 and at another end at spaced locations on the rear wall 1019 of the dish-shaped part 1012 to form a four-bar linkage which permits out-of-plane displacement and bending of the rings 1002, 1010 on the primary bending axis, and also allows controlled in-plane displacement of the rings 1002, 1010 upon actuation of the assembly. In this way, the four-bar linkages 1024 can be used to adjust the strain applied to the membrane 1008 when the assembly 1001 is actuated. The four-bar linkages 1024 are disposed "inboard" of the membrane-supporting rings 1002, 1010, within the fluid 1011. The membrane assembly 1001 of the eighth embodiment is suitable for use in a lens assembly, in which case, in common with other embodiments described above, the membrane 1008, fluid 1011 and rear cover plate 1016 should be suitably transparent and preferably index matched. Similarly, for such optical applications, the four-bar linkages 1024 should be index matched to the fluid 1011, so that they are invisible to the user.

FIG. 23 shows a membrane assembly 1101 in accordance with a ninth embodiment of the invention which is similar to the membrane assembly 1001 of the eighth embodiment described in the preceding paragraphs, except the membrane assembly 1101 of the ninth embodiment comprises bending control linkages 1124 which are disposed outboard of membrane-supporting rings 1102, 1110. In FIG. 23, the membrane assembly 1101 is shown in an actuated state.

The membrane assemblies 1001; 1101 of the eighth and ninth embodiments of the invention respectively may be used for optical applications, such as lens assemblies, and non-optical applications. The terms "front", "rear" etc. are used to describe the parts of the assemblies 1001; 1101 for clarity and consistency with the descriptions of the previous embodiments of the invention. These terms are appropriate for lens assemblies, where they describe the parts in the context of eyeglasses of the kind shown in FIGS. 1 and 2. For applications (optical and non-optical) other than lens assemblies for eyewear, the parts described as being "front" or "rear" need not necessarily be disposed at or towards the front or rear of the relevant assembly. For instance, in some applications, the membrane may be disposed facing upwardly, so that the "front membrane-supporting ring" is actually disposed above the "rear membrane-supporting ring", and similar terms should be construed accordingly. Indeed, as will be apparent from the present specification, the membrane assemblies of the invention may be used for a wide variety of different applications, and even the assemblies of the first to seventh embodiments described above may be suitably adapted for use in other fields, where the terms "front" and "rear" may not describe the actual position of the respective parts in use, but nevertheless these terms are useful to describe the relative spatial relationships of the parts within the assemblies of the different embodiments.

Figure 24:
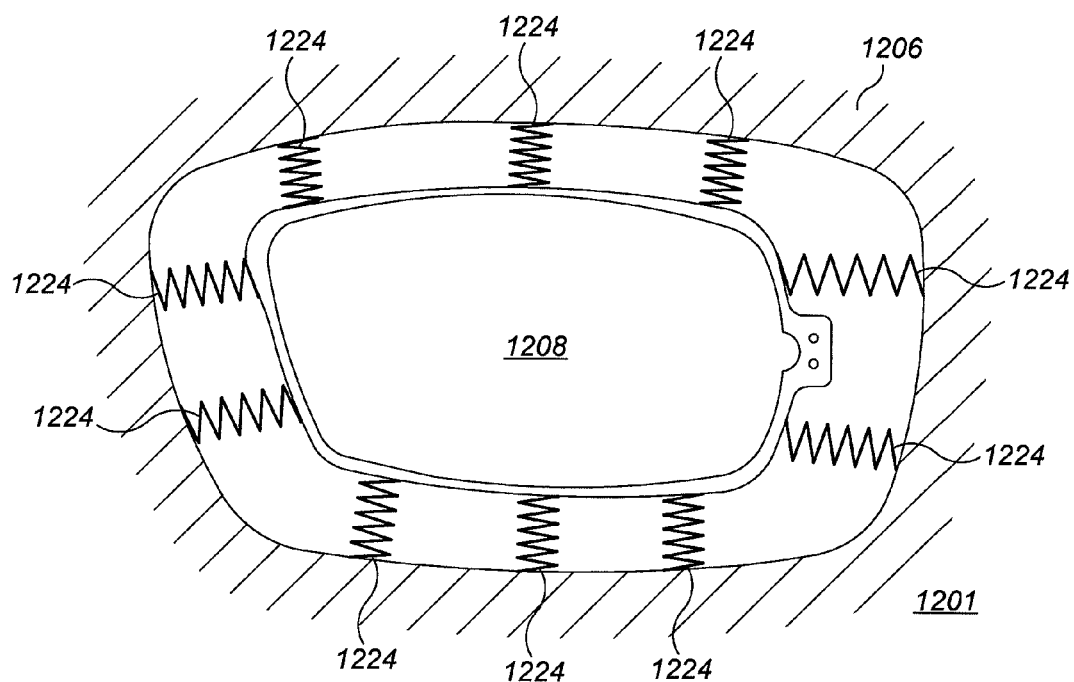
FIG. 24 is a schematic front elevation of a membrane assembly in accordance with a tenth embodiment of the invention comprising "outboard" bending control springs.

FIG. 24 shows schematically a membrane assembly 1201 in accordance with a 10th embodiment of the invention in which the ring bending controllers comprise a plurality of springs 1224 that are disposed circumferentially around the periphery—"outboard"—of a membrane supporting ring 1202. Each spring 1224 is fixedly secured at one end to the membrane supporting ring 1202 and at another end to an immovable support 1206 which is shown only schematically in FIG. 24. As described above, the support 1206 may comprise a retaining ring of the kind described in relation to the first and second embodiments, or a housing, case etc. according to the application of the membrane assembly 1201. An elastic membrane 1208 is stretched across the membrane-supporting ring 1202 under pre-tension.

The membrane 1208 is in contact with a body of fluid (not shown) and an adjuster is provided for adjusting the pressure of the fluid to cause selectively the membrane 1208 to inflate in a manner similar to that described in the previous embodiments. The membrane-supporting ring 1202 is bendable, having a bending stiffness which varies round its extent to control the shape of the membrane 1208 upon actuation in accordance with the principles of the present invention.

The bending control springs 1224 allow out of plane displacement of the membrane supporting ring 1202 for instance to allow actuation of the assembly 1201 and also to allow bending of the ring 1202 by deflection on the primary bending axis to vary the profile of the ring in use to control the shape of the membrane. The bending control springs 1224 also allow a controlled degree of in-plane bending or deformation of the membrane-supporting ring 1202 to control the strain in the membrane 1208 upon actuation. The springs 1224 should have a modulus that is selected to resist in-plane displacement of the membrane-supporting ring 1202 in the un-actuated state under the pre-tension in the membrane 1208 alone, but may allow controlled displacement of the ring 1202 under the increased tension in the membrane 1208 when the assembly is actuated.

Figure 25:
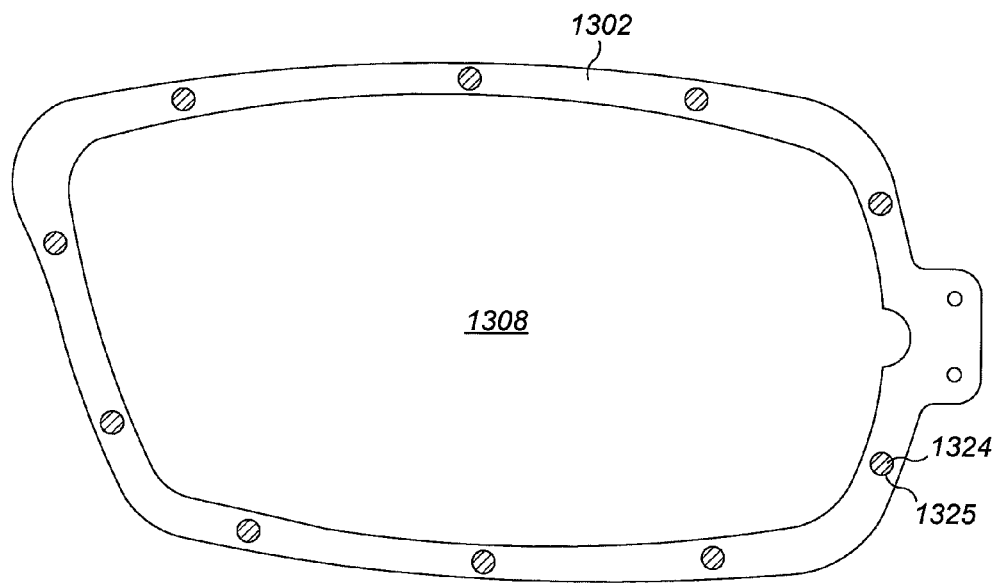
FIG. 25 is a schematic front elevation of a part of another lens assembly in accordance with an eleventh embodiment of the invention in which the membrane supporting rings are arranged to slide on a plurality of circumferentially spaced pins to resist in-plane bending of the rings under the surface tension in the membrane.
Figure 26:
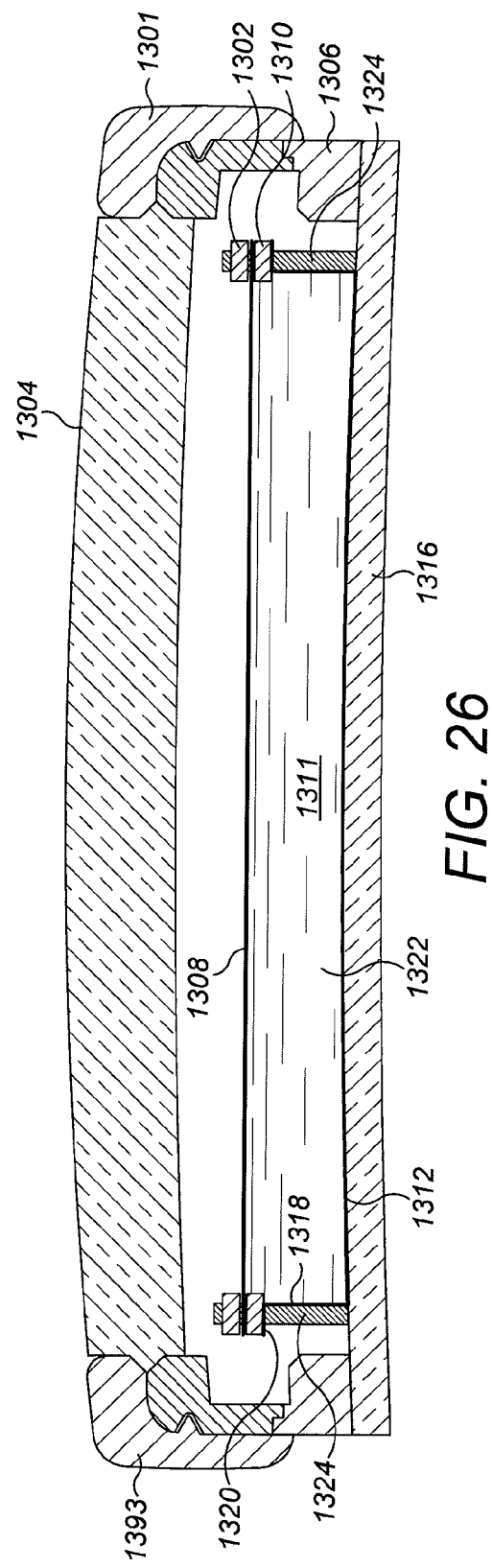
FIG. 26 is a schematic side elevation of the lens assembly of FIG. 25 in an un-actuated state.
Figure 27:
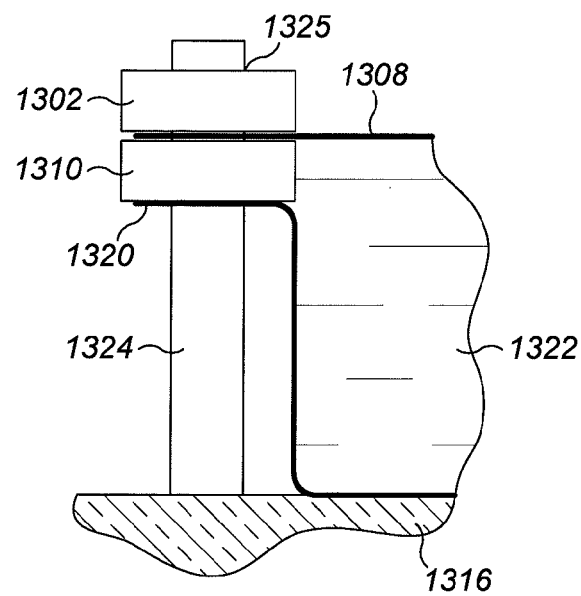
FIG. 27 is an enlarged side elevation showing the mounting of the membrane supporting rings to one of the pins of the assembly of FIGS. 25 and 26.

FIGS. 25-27 show schematically a membrane assembly 1301 according to an 11$^{th}$ embodiment of the invention, in which the ring bending controllers are provided by a plurality of forwardly extending pins 1324 that are circumferentially spaced round a pair of front and rear membrane-supporting rings 1302, 1310. As best seen in FIG. 27, each pin 1324 is fixedly secured to and projects forwardly from a rear cover plate 1316 and extends through a corresponding aperture 1325 formed in the rings 1302, 1310 such that the rings can slide on the pins 1324. The construction and operation of the membrane assembly 1301 of the 11$^{th}$ embodiment is similar to the construction and operation of the assemblies 201; 901 of the second and seventh embodiments described above except in relation to the bending controllers 1324, which permit out-of-plane displacement of the membrane-supporting rings 1302, 1310 on the z-axis for actuation of the assembly 1301 and to control the profile of the rings 1302, 1310 in the manner hereinbefore described, but prevent in-plane bending or other deformation of the rings 1302, 1310.

The pins 1324 may be adhesively bonded to the rear cover plate 1316 or fixed by other suitable means known to those skilled in the art. The assembly 1301 comprises a fluid-filled cavity 1322 formed by a membrane 1308 and a dish-shaped part 1312 having a flexible side wall 1318, and the pins are disposed adjacent the side wall 1318 outside the cavity, and extend through a forward facing flange 1320 on the side wall 1318 that is sealed peripherally to the membrane sub-assembly 1302, 1308, 1310 inside the pins 1324.

Figure 28:
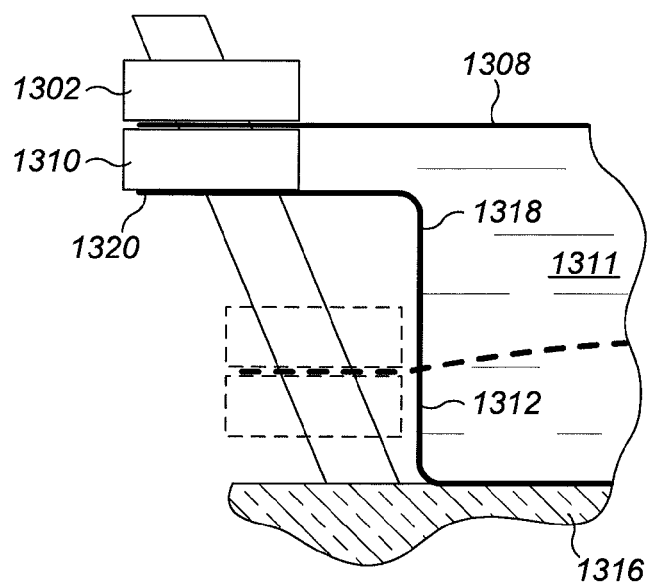
FIG. 28 is an enlarged side elevation of a variant of the eleventh embodiment, in which one of more of the pins are set at an oblique angle to control the in-plane bending of the membrane supporting rings.

In a variant of the 11$^{th}$ embodiment, one or more of the pins 1324 may be mounted on the rear cover plate 1316 at an oblique angle. Suitably each pin 1324 extends forwardly of the rear cover plate 1316 and sideways substantially at a right-angle in the x-y plane to the adjacent region of the membrane supporting rings 1302, 1310. The assembly 1301 is actuated by compressing the side wall 1318 in a manner similar to that described above in relation to the previous embodiments of the invention. At one or more actuation points the rings 1302, 1310 are actively displaced on the primary bending axis by a suitable actuator (not shown); at other locations the rings 1302, 1310 bend on the primary bending axis out-of-plane owing to the variable bending stiffness of the rings 1302, 1310 round their extent. Where the rings are displaced out-of-plane at a point where they are mounted on angled pins 1324, the rings 1302, 1310 are also caused to move in-plane as shown in FIG. 28, and this may be used to control the strain applied to the membrane 1308 when the assembly is actuated.

It will also be appreciated that in some locations where the edge of the membrane 1308 should not be displaced out-of-plane to achieve the predefined profile, the rings 1302, 1310 may be fixed to the pins 1324 in a manner to prevent sliding movement. The skilled person will be able to determine the requisite number of pins and their desired configuration to achieve the desired in-plane and out-of-plane movement of the edge of the membrane 1308 round its extent.

Figure 29:
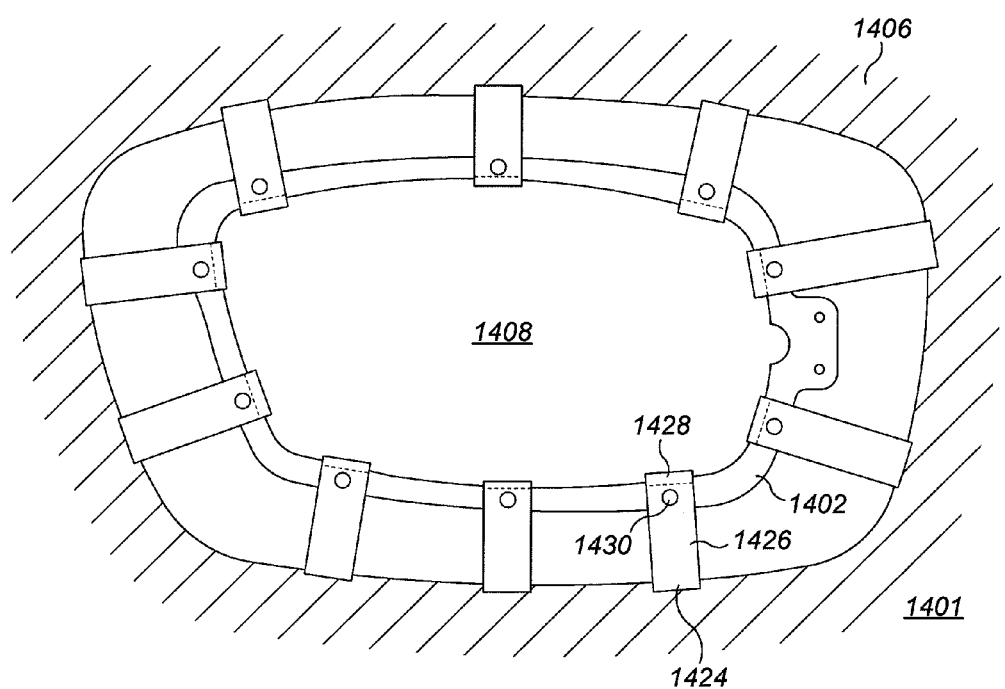
FIG. 29 is a schematic front elevation of part of a membrane assembly in accordance with a twelfth embodiment of the invention, in which the membrane supporting rings are carried by a plurality of circumferentially spaced depending bendable rods to control the in-plane bending of the rings under the surface tension in the membrane.
Figure 30:
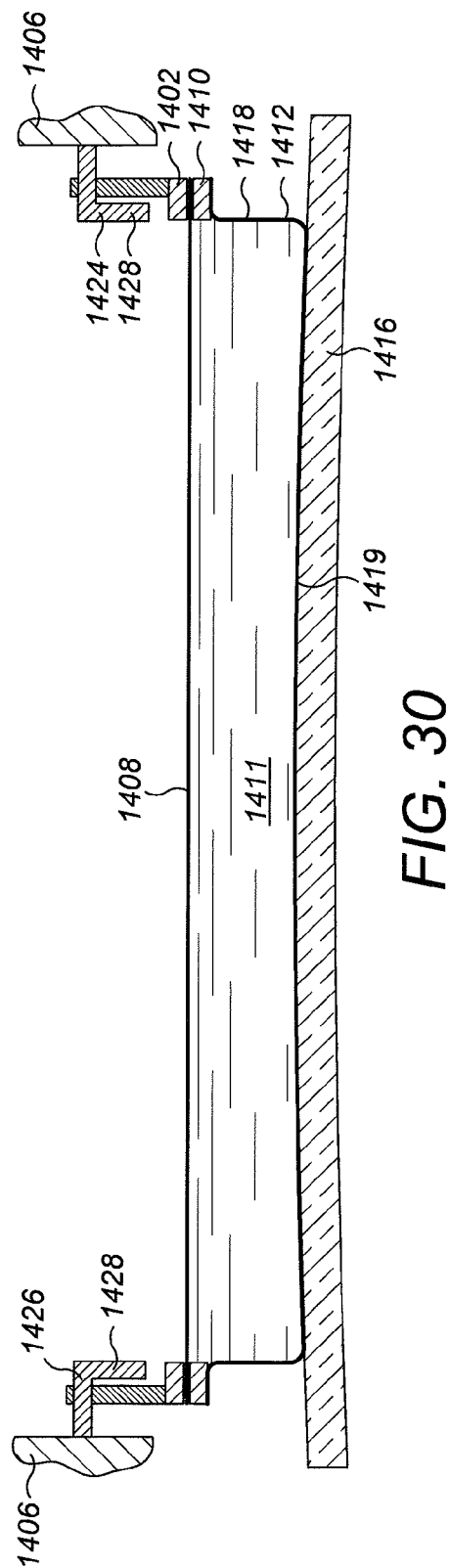
FIG. 30 is a schematic cross-sectional side elevation of the assembly of the twelfth embodiment in an un-actuated state.

FIGS. 29-31 show schematically a membrane assembly 1401 according to a 12$^{th}$ embodiment of the invention. As shown in FIG. 30, the assembly 1401 of the 12$^{th}$ embodiment comprises a ring sub-assembly comprising front and rear bendable membrane supporting rings 1402, 1410 which sandwich between them an elastic membrane 1408 that is held by the rings under pre-tension. The sub-assembly is carried on a forward facing flange 1420 of a dish-shaped part 1412 having a flexible sidewall 1418 and rear wall 1419 that is supported by a rigid rear cover plate 1416. The membrane 1408 and part 1412 define an envelope that is filled with a suitable fluid 1411 of the kind described above.

The sub-assembly is also attached at spaced locations round its extent as shown in FIG. 29 to a plurality of bending control fixings 1424. Each fixing 1424 comprises a flanged nib 1426 that is fixedly secured to an immovable part 1406 of the assembly 1401, which part 1406 is shown schematically in FIGS. 29-31. As with previous embodiments, the part 1406 may be part of a housing, case, retaining ring, frame or the like that accommodates the moveable parts of the assembly. In some embodiments the nibs 1426 may be formed integrally with the part 1406.

Figure 31A:
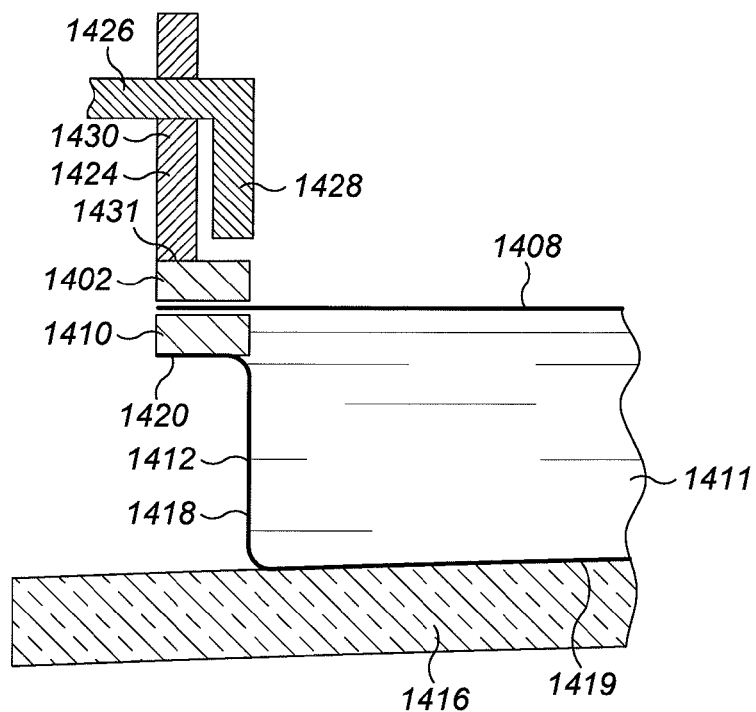
FIGS. 31A and 31B are enlarged side elevations, respectively in the un-actuated and actuated states, showing the attachment of the membrane supporting rings to one of the rods of the assembly of FIGS. 29 and 30.
Figure 31B:
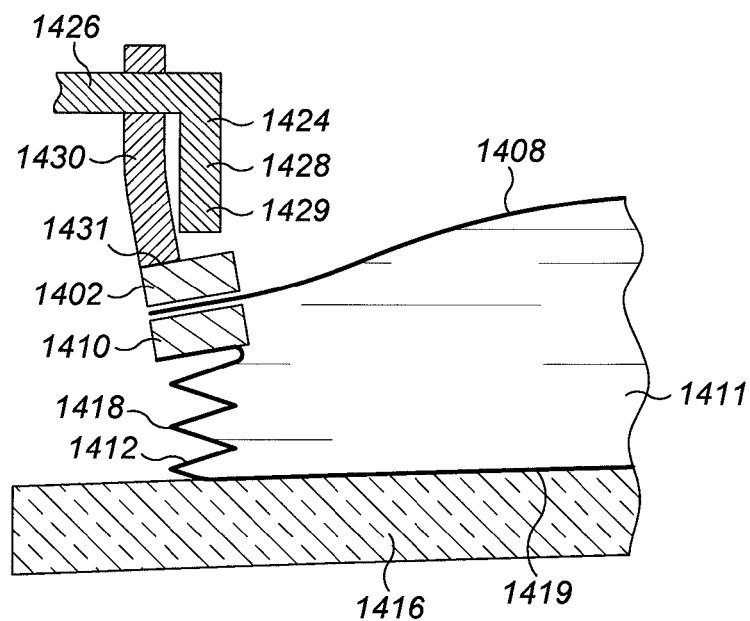

In the assembly of the 12$^{th}$ embodiment, each of the nibs 1426 is disposed forwardly of the membrane sub-assembly and comprises a rearwardly extending flange 1428 that terminates in rear end 1429 spaced forwardly of the front ring 1402. Each nib slidably bears a bendable rod 1430 that extends in the front-rear direction on the z-axis. The bendable rod 1430 has a rear end 1431 that is attached to the front membrane-supporting ring 1402, as best seen in FIGS. 31A and 31B. The rod is disposed outside and closely adjacent the flange 1428 of the nib 1426 relative to the membrane 1408.

In an un-actuated state, as shown in FIG. 31A, the rear end 1431 of the rod 1430 protrudes a short distance beyond the rear end 1429 of the flange 1428, but is prevented from bending significantly inwards under the influence of the surface tension in the membrane 1408 by the flange 1429.

However, upon actuation, the side wall 1418 of the part 1412 is compressed in a manner similar to that described for previous embodiments using a suitable actuation device (not shown). The fixings 1424 allow out-of-plane displacement of the rings 1402, 1410 for compressing the side wall 1418 and for bending round their extent to control the profile of the edge of the membrane to achieve the predefined membrane form. As the rings are displaced on the z-axis, the rod 1430 slides longitudinally relative to the nib 1426. This causes the rear end 1431 of the rod 1430 to protrude further beyond the rear end 1429 of the flange 1428, so the rear end of the rod is unrestrained by the flange. The rear end 1431 of the rod 1430 is thus allowed to bend inwards relative to the membrane 1408 under the influence of the surface tension in the membrane 1408. The stiffness of the rod 1430 is selected to control the bending of the rod when the assembly 1401 is actuated, to control the strain in the membrane 1408.

It will be appreciated that the rods 1430 round the membrane-supporting rings 1402, 1410 may have the same or different stiffnesses. Where the rings 1402, 1410 are connected to a rod at a region round the rings where they are required not to be displaced out-of-plane upon actuation, the rod 1430 may be prevented from sliding with respect to its corresponding nib 1426.

The present invention thus provides a membrane assembly 1; 201; 601; 801; 901; 1001; 1201; 1301; 1401 comprising a fluid-filled envelope which is bounded on a least one side by an elastic membrane 8; 208; 608; 708; 808; 1008; 1208; 1308; 1408 that is held under tension by one or more bendable, peripheral membrane-supporting rings 2, 10; 202; 510; 602, 610; 702, 710; 802, 810; 902, 910; 1002, 1010; 1102, 1110; 1202, 1210; 1302, 1310; 1402, 1410. The fluid pressure within the envelope may be increased, e.g., by compressing the envelope, or decreased, e.g., by expanding the envelope, to change the pressure difference across the membrane, thereby causing the membrane to distend convexly or concavely respectively. The bending stiffness of the membrane-supporting ring or rings 2, 10; etc. varies round their extent to control the profile of the edge of the membrane 8; etc. upon actuation. According to the invention, a variety of different types of ring bending controllers 24; 124; 324; 424; 524; 624; 724; 824; 924; 1024; 1124; 1224; 1324; 1424 are provided which permit out-of-plane bending of the ring or rings 2, 10; etc. by deflection, but resist or control in-plane bending or deformation of the ring or rings 2, 10; etc. In some embodiments, the ring bending controllers 624; 724; 1024; 1124; 1224; 1324; 1424 may permit a controlled degree of in-plane bending of the ring or rings 2, 10; etc. in order to control the strain in the membrane 8; etc. upon actuation. The ring bending controllers may comprise a membrane supporting disk 24; 124; 224; 324; 424 which prevents or substantially prevents in-plane bending of the ring or rings 2, 10 etc., a plurality of struts 524; levers 624; 724, linkages 824; 924; 1024; 1124, springs 1224 or other bending controllers such as the pins 1324 of the 11th embodiment of the invention on which the ring or rings 2, 10; etc. are arranged to slide, or the bendable rods 1430 of the 12th embodiment, which are designed to allow a controlled degree of in-plane bending when the assembly is actuated.

Other ways of controlling the bending of the membrane-supporting ring or rings 2, 10; etc. may be apparent to those skilled in the art following the teachings of the present specification. The present invention advantageously permits the use of bendable membrane-supporting rings 2, 10; etc. to control the profile of the edge of the membrane upon actuation while preventing undesired or uncontrolled bending of the supporting rings 2, 10; etc. as a result of the surface tension in the membrane 8; etc.

As mentioned above, the embodiments of the invention have been described herein with particular reference to lens assemblies, more particularly lens assemblies for use in eyewear. However, the lens assemblies of the present invention are equally well applicable to other lens applications, such as goggles, helmets and scientific and optical instruments of various sorts. In a lens assembly, the optical parts are transparent as described below, but the invention also comprehends other kinds of deformable membrane assemblies which are constructed and operate in a similar manner to provide a controllably adjustable surface. Within the optical field, for instance, the invention may be used to provide a controllably adjustable mirror surface, and membrane assemblies of the invention may also find applications in non-optical fields, such as acoustics, where a surface with a selectively and controllably adjustable dynamic shape may be required.

The lens assemblies of the invention 1; 201; 601; 701; 801; 901; 1201; 1301; 1401 are especially suitable for the correction of presbyopia. In use, the lens assembly 1; etc. can be adjusted by actuating the assembly for bringing into focus objects at a range of distances from long distance to close distance.

The invention claimed is:

1. A deformable membrane assembly comprising:
    an elastic membrane that is held under tension around its edge by a flexible membrane supporting member;
    a body of fluid in contact with one face of the membrane, the pressure of the fluid being controllable for adjusting the shape of the membrane by causing the membrane to distend in a direction of distention;
        wherein the membrane supporting member is configured to bend in a direction of a primary bending axis, the primary bending axis being substantially parallel to the direction of distension, the membrane supporting member configured to bend by localized deflection at one or more regions located around the membrane supporting member, the localized deflection on the primary bending axis to change the profile of the edge of the membrane as the membrane is distended; and
    one or more bending controllers acting on the supporting member in a plane normal to the primary bending axis to control the bending of the supporting member in response to loading through tension in the membrane;
        wherein the one or more bending controllers resist deformation of the membrane supporting member in the plane normal to the primary bending axis while allowing for substantial deflection of the supporting member on the primary bending axis.

2. The deformable membrane assembly as claimed in claim 1, wherein the body of fluid is contained within an envelope of adjustable volume, and the assembly comprises a selectively operable adjuster for adjusting the volume of the envelope to control the pressure of the body of fluid.

3. The deformable membrane assembly as claimed in claim 2, wherein said envelope is mounted to a fixed support, and said adjuster is operable to compress or expand the envelope relative to the fixed support.

4. The deformable membrane assembly as claimed in claim 1, wherein the body of fluid is contained within an envelope of substantially constant volume, and the assembly comprises a selectively operable device for injecting or removing fluid from the envelope, thereby to control the pressure of the body of fluid.

5. The deformable membrane assembly as claimed in claim 1, wherein the membrane is non-circular.

6. The deformable membrane assembly as claimed in claim 1, wherein the one or more bending controllers allow the supporting member to bend in a direction normal to the primary bending axis in a controlled way upon actuation of the assembly.

7. The deformable membrane assembly as claimed in claim 1, wherein said one or more bending controllers comprise a reinforcing diaphragm.

8. The deformable membrane assembly as claimed in claim 7, wherein said reinforcing diaphragm comprises a plate disposed within the body of fluid and having one or more apertures extending therethrough.

9. The deformable membrane assembly as claimed in claim 8, when dependent on claim wherein the plate is configured to deflect in the direction of the primary bending axis along two mutually transverse axes.

10. The deformable membrane assembly as claimed in claim 8, wherein the plate is annular.

11. The deformable membrane assembly as claimed in claim 8, wherein said plate carries one or more depending ribs that serve to reinforce the plate against deformation when the membrane is planar.

12. The deformable membrane assembly as claimed in claim 11, wherein said rib or ribs are joined to the plate at or in the vicinity of points where the supporting member is not displaced upon actuation of the assembly.

13. The deformable membrane assembly as claimed in claim 12, wherein said ribs follow contours where the membrane is not displaced upon actuation.

14. The deformable membrane assembly as claimed in claim 12, wherein one or more linear ribs are provided that extend across the plate.

15. The deformable membrane assembly as claimed in claim 11, wherein the assembly comprises one or more fixed parts and said one or more ribs engage with the or one or more of said fixed parts to reinforce the plate against buckling.

16. The deformable membrane assembly as claimed in claim 1, wherein the one or more bending controllers comprise a plurality of struts that extend between opposite sections or regions of the membrane supporting member.

17. A deformable membrane assembly as claimed in claim 1, wherein the one or more bending controllers comprise a plurality of levers, wherein each lever is secured at one end to the membrane or membrane supporting member and, at the other end, to one or more fixed parts of the assembly, and wherein each lever allows free bending of the supporting member by deflection on the primary bending axis and allows controlled deformation of the supporting member in a plane normal to the bending axis.

18. The deformable membrane assembly as claimed in claim 1, wherein the one or more bending controllers comprise a plurality of linkages circumferentially spaced round the periphery of the membrane, wherein each linkage is connected between the membrane or the membrane supporting member and one or more fixed parts of the assembly.

19. The deformable membrane assembly as claimed in claim 18, wherein adjusting the pressure of the body of fluid causes the membrane to distend, and the supporting member is configured to bend in a predetermined manner by localised deflection on a primary bending axis parallel to the direction of distension of the membrane to control the shape of the membrane; and
wherein each linkage is configured to permit bending of the membrane supporting member by deflection on the primary bending axis, but to resist deformation of the supporting member in a plane normal to the primary bending axis.

20. The deformable membrane assembly as claimed in claim 18, wherein adjusting the pressure of the body of fluid causes the membrane to distend, and the supporting member is configured to bend in a predetermined manner by localised deflection on a primary bending axis parallel to the direction of distension of the membrane to control the shape of the membrane; and
wherein each linkage is configured to permit bending of the membrane supporting member by deflection on the primary bending axis and to allow controlled deformation of the supporting member in a plane normal to the primary bending axis.

21. The deformable membrane assembly as claimed in claim 17, wherein the struts or linkages are configured to allow differing amounts of in-plane displacement round the extent of the membrane support member.

22. The deformable membrane assembly as claimed in claim 1, wherein the one or more bending controllers comprise a plurality of spring members, each of which is connected at one end to the membrane supporting member and at the other end to a suitable constraint boundary.

23. The deformable membrane assembly as claimed in claim 1, wherein the one or more bending controllers comprise a plurality of slides that are engaged with the membrane supporting member to constrain movement of the supporting member upon actuation of the assembly to a predefined locus along the slides.

24. The deformable membrane assembly as claimed in claim 1, wherein the one or more bending controllers comprise a plurality of bendable rods disposed at spaced locations round the membrane supporting member, each rod being aligned with the primary bending axis, being connected at one end to the supporting member and being engaged slidably with a mounting member that is fixedly secured to a fixed part of the assembly to allow sliding of the rod on the primary bending axis, and each mounting member including a flange that is arranged to prevent the rod bending transversely when the assembly is un-actuated; the arrangement being such that upon actuation of the assembly, bending of the supporting member by deflection on the primary bending axis causes one or more of the rods to slide relative to their respective mounting members, such that the one end of each connecting rod protrudes beyond the flange, the portion of the rod that is thus disclosed bending in a plane transverse to the primary bending axis under the surface tension in the membrane.

25. An article of eyewear comprising a deformable membrane assembly in accordance with claim 1.

* * * * *